US005802438A

United States Patent [19]

Bennett et al.

[11] Patent Number: 5,802,438

[45] Date of Patent: Sep. 1, 1998

[54] METHOD FOR GENERATING A CRYSTALLINE $^{99}MoO_3$PRODUCT AND THE ISOLATION $^{99m}$TC COMPOSITIONS THEREFROM

[75] Inventors: Ralph G. Bennett; Jerry D. Christian, both of Idaho Falls; Robert J. Kirkham, Blackfoot; Troy J. Tranter, Idaho Falls, all of Id.

[73] Assignee: Lockheed Martin Idaho Technologies Company, Idaho Falls, Id.

[21] Appl. No.: 801,981

[22] Filed: Feb. 19, 1997

[51] Int. Cl.[6] .......... C01G 57/00; C01G 39/02

[52] U.S. Cl. .......... 423/2; 423/59; 423/249; 376/186; 376/189; 376/190; 976/DIG. 398

[58] Field of Search .......... 423/2, 59, 249; 376/190, 186, 189; 976/DIG. 398; 23/294 R

[56] References Cited

U.S. PATENT DOCUMENTS

| | | |
|---|---|---|
| 3,519,385 | 7/1970 | Hurst et al. . |
| 3,799,883 | 3/1974 | Hirofumi et al. . |
| 3,833,469 | 9/1974 | Robson . |
| 4,017,583 | 4/1977 | Motojima et al. . |
| 4,123,498 | 10/1978 | Rosenbaum et al. . |
| 4,981,658 | 1/1991 | Ali et al. . |
| 5,382,388 | 1/1995 | Ehrhardt et al. . |

FOREIGN PATENT DOCUMENTS

| | | |
|---|---|---|
| 36752/78 | 4/1981 | Australia . |
| 169575 | 10/1977 | Hungary . |

OTHER PUBLICATIONS

Rösch, F., et al., "Thermochromatographic Separation of $^{94m}$Tc from Enriched Molybdenum Targets and its Large Scale Production for Nuclear Medical Application", *Radiochimica Acta*, 64 (2) :113—120 (1994).

Levin, V., et al., "A Sublimation Generator For $^{99m}$Tc", *Radiochem. Radioanal. Letters*, 32 (2) :141—149 (1979).

Zsinka, L., et al, "New Portable Generator for the Sublimation of Technetium-99m", International Conference on Radiopharmaceuticals and Labelled Compounds, Toyko, Japan, pp. 95—106 (Oct. 24, 1984).

Bremer, K., "Large-Scale Production and Distribution of Tc-99m Generators for Medical Use", *Radiochimica Acta*, 41:73—81 (1987).

Boyd, R.E., "Technetium-99m Generators—The Available Options", *Int. J. Appl. Radiat. Isot.*, 33:801—809 (1982).

Molinski V. "A Review of $^{99m}$Tc Generator Technology", *Int. J. Appl. Radiat. Isot.*, 33:811—819 (1982).

Boyd, R.E., "Molybdenum-99: Technetium-99m Generator", *Radiochimica Acta*, 30(3) :123—145 (1982).

Colombetti, L., et al., "Study of the Purity of $^{99m}$Tc Sublimed from Fission $^{99}$Mo and the Radiation Dose from the Impurities", *Int. J. Appl. Radiat. Isot.*, 25:35—41 (1974).

Tachimori, S., et al., "Diffusion of Tc-99m in Neutron Irradiated Molybdenum Trioxide and Its Application to Separation", *Journal of Nuclear Science and Technology*, 8 (6) :295—301 (Jun. 1971).

(List continued on next page.)

*Primary Examiner*—Ngoclan Mai

*Attorney, Agent, or Firm*—Klaas Law O'Meara & Malkin

[57] ABSTRACT

An improved method for producing $^{99m}$Tc compositions. $^{100}$Mo metal is irradiated with photons in a particle (electron) accelerator to produce $^{99}$Mo metal which is dissolved in a solvent. A solvated $^{99}$Mo product is then dried to generate a supply of $^{99}MoO_3$ crystals. The crystals are thereafter heated at a temperature which will sublimate the crystals and form a gaseous mixture containing vaporized $^{99m}TcO_3$ and vaporized $^{99m}TcO_2$ but will not cause the production of vaporized $^{99}MoO_3$. The mixture is then combined with an oxidizing gas to generate a gaseous stream containing vaporized $^{99m}Tc_2O_7$. Next, the gaseous stream is cooled to a temperature sufficient to convert the vaporized $^{99m}Tc_2O_7$ into a condensed $^{99m}$Tc-containing product. The product has high purity levels resulting from the use of reduced temperature conditions and ultrafine crystalline $^{99}MoO_3$ starting materials with segregated $^{99m}$Tc compositions therein which avoid the production of vaporized $^{99}MoO_3$ contaminants.

26 Claims, 1 Drawing Sheet

OTHER PUBLICATIONS

Zsinka, L., "$^{99m}$Tc Sublimation Generators", *Radiochimica Acta,* 41:91—96 (1987).

Zsinka, L., et al., "Recent Development in the Sublimation Generator of $^{99}$Tc$^{m}$", *Journal of Labelled Compounds and Radiopharmaceuticals,* 19 (11—12) :1573—1574 (1982).

Rusek, V., et al., "Thermal Separation of $^{99m}$Tc from Molybdenum Trioxide. I. Separation of $^{99m}$", from Molybdenum Trioxide at Temperatures Below 650°*Radiochem. Radioanal. Letters,* 20 (1) 23—31 (1974).

Machan, V., et al., "Thermal Separation of $^{99m}$Tc from Molybdenum Trioxide, III. Diffusion Separation of $^{99m}$Tc from Molybdenum Trioxide from the Standpoint of Its Possible Use in Technetium Generator"*Radiochem. Radionanal. Letters,* 20 (1) :33—40 (1974).

Vlcek, J., et al., "Thermal Separation of $^{99m}$Tc from Molybdenum Trioxide. IV. Diffusion of $^{99m}$Tc from Molybdenum Trioxide: Application for Greater Amounts of $MoO_3$", *Radiochem. Radioanal. Letters,* 25 (3) : 173—178 (1976).

Rusek, V., et al., "Thermal Separation of $^{99m}$Tc from Molybdenum Trioxide. V. Thermal Separation of $^{99m}$Tc from Molybdenum Trioxide Using a Carrier–Gas", *Radiochem. Radioanal. Letters,* 25 (3) :179—186 (1976).

Davydov, M., et al., "Preparation of $^{99}$ Mo and $^{99m}$Tc in Electron Accelerators", Translated from *Radiokhimiya,* 35 (5) :91—96 (Sep.—Oct. 1993).

Saha, G.B., *Fundamentals of Nuclear Pharmacy,* Third Ed., New York, pp. 65—79 Springer–Verlag (1992).

Helus, F., et al., "System for Routine Production of $^{99m}$Tc by Thermal Separation Technique", *J. Radiolabelled Compounds and Radiopharamaceuticals,* 13 (2) :190 (1977).

Hupf, H., et al., "Sublimation as a Separation System for Radionuclide Generators: Mo–99–Tc–99m, A Working Example", *Southern Med. J.,* 64 (11) :1432 (Nov. 1971).

Toren, D., et al., "Automatic Production of $^{33m}$Tc for Pharmaceutical Use", *J. Nuc. Med.,* 11 (6) :368—369 (1970).

METHOD FOR GENERATING A CRYSTALLINE $^{99}MOO_3$PRODUCT AND THE ISOLATION $^{99M}TC$ COMPOSITIONS THEREFROM

CONTRACTUAL ORIGIN OF THE INVENTION

The United States Government has rights in this invention pursuant to contract number DE-AC07-94ID13223 between the U.S. Department of Energy and Lockheed Idaho Technologies Company.

BACKGROUND OF THE INVENTION

The present invention generally relates to the production of $^{99m}Tc$ and related compositions, and more particularly to the production of a specialized crystalline $^{99}MoO_3$ composition and a sublimation process for isolating $^{99m}Tc$ compositions therefrom.

$^{99m}Tc$ compositions (which shall collectively include both elemental $^{99m}Tc$ and $^{99m}Tc$-containing compounds) are currently being used in 80–90% of all nuclear medical imaging procedures in the United States. These procedures are employed for many different purposes including cancer detection. At the present time, more than 10 million $^{99m}Tc$ scans are conducted in the United States per year. Likewise, the use of $^{99m}Tc$ compositions for medical imaging purposes has steadily increased over the past twenty years. From a commercial standpoint, there are over two dozen $^{99m}Tc$-based drug products which have been approved by the U.S. Food and Drug Administration (hereinafter "FDA"). These compositions are used to analyze the following tissue materials: bone, liver, lung, brain, heart, kidney, and other organs as discussed in Wagner, H. et al., "The Present and Future of $^{99m}Tc$", pp. 161–164, in E. Deutsch, ed., *Technetium in Chemistry and Nuclear Medicine,* Cortina Int'l, Verona (1983). Likewise, $^{99m}Tc$ compositions have continued to make steady inroads on established radioisotope products including $^{201}Tl$ for cardiac analysis and $^{75}Se$ for brain, liver and kidney imaging. It is therefore anticipated that the demand for $^{99m}Tc$ medical products will grow steadily (e.g. by at least about 5% per year) over the next decade or more.

$^{99m}Tc$ compositions have many beneficial characteristics when used in nuclear imaging processes. These characteristics are discussed in numerous references, including Saha, G. B., *Fundamentals of Nuclear Pharmacy*, Third Ed., New York, pp. 65–79, Springer-Verlag (1992). For example, $^{99m}Tc$ has a six hour half-life which is important from a safety and compatibility perspective when human subjects are involved. Furthermore, $^{99m}Tc$ emits a substantial amount of 141 keV gamma radiation with very little particulate emission (e.g. in the form of conversion electrons). This gamma energy level is useful since it can exit the human body from deep organs (e.g. the heart), yet is not too high to collimate effectively in modern gamma camera units. In addition, the $^{99}Mo$ parent of $^{99m}Tc$ has a half-life which is about ten times that of $^{99m}Tc$. This relationship facilitates the development of a radionuclide generator that produces high yields of easily-separated $^{99m}Tc$ compositions.

$^{99m}Tc$ compositions are also useful in many chemically-induced radiolabelling reactions, including the formation of chelates from reduced technetium or from ligand exchange processes. Accordingly, $^{99m}Tc$ compositions have many different characteristics which are of considerable value in medical imaging applications. As a final point of background information, the "m" in $^{99m}Tc$ signifies the metastable excited state of the technetium isotope whose atomic weight is 99. This metastable state has the aforementioned half life of six hours, and is a medically useful radioisotope of technetium. This is distinct from the ground state of the same isotope $^{99}Tc$ which has no medical usefulness. $^{99}Tc$ is also radioactive but has a half life of about 213,000 years. The metastable state decays into the ground state, so $^{99}Tc$ is always present to some degree in $^{99m}Tc$ compositions and increases with time. The two isomeric states of the same nucleus are impossible to distinguish chemically, and the $^{99}Tc$ effectively competes with the $^{99m}Tc$ in all known radiolabelling reactions. Thus, as a practical matter, suppliers of $^{99m}Tc$ compositions always need to address how they will keep the amount of $^{99}Tc$ contamination within acceptable levels through prompt handling and distribution. Since $^{99m}Tc$ compositions are the desired materials to be isolated in this case, the "m" designation will be used herein for the sake of clarity and convenience with respect to all of the intermediate and final $^{99m}Tc$ compositions that are produced in accordance with the claimed process.

Many different methods have been used to produce $^{99m}Tc$ compositions in the past. To manufacture a desired $^{99m}Tc$ product, two basic processing steps are of importance. First, a suitable method must be employed to generate the "parent" nuclide (e.g. $^{99}Mo$), followed by a method for separating the $^{99m}Tc$ "daughter" from its parent. The first demonstration of a $^{99}Mo/^{99m}Tc$ generator occurred in 1957 which involved the activation of $^{99}Mo$ from either natural molybdenum or enriched $^{98}Mo$ in accordance with the following reaction:

$$^{98}Mo\ (n,\gamma)^{99}Mo \tag{1}$$

The $^{99}Mo$ produced using this approach (which is characterized as "activation moly") is generally limited to a low specific activity level of about 2 Ci/g. Virtually all of the $^{99m}Tc$ manufactured during the 1960s and 1970s involved the activation of $^{99}Mo$ from either natural molybdenum or enriched $^{98}Mo$ as described above.

In 1974, new generator technology was developed as described in U.S. Pat. No. 3,799,883 which enabled the production of "fission moly" using the following reaction:

$$^{235}U(n,\text{fission})^{99}Mo \tag{2}$$

This process is the most commonly used method for producing $^{99}Mo$ today. The production of "fission moly" as described above generates $^{99}Mo$ fission products with a specific activity above 3000 Ci/g. While a high specific activity product is generated using this approach, the entire production system is expensive, complex, and requires substantial amounts of advanced equipment to achieve a high-purity product. In addition, the generation of "fission moly" necessitates the use of high enriched uranium (hereinafter "HEU") as a starting material. High enriched uranium is expensive and presents numerous handling/safety problems. Finally, this process generates substantial amounts of hazardous, long-term nuclear wastes (e.g. $^{236}U$, $^{239}Pu$, $^{90}Sr$, $^{85}Kr$, $^{137}CS$, $^{134}CS$, and $^{237}Np$) which likewise create disposal problems.

A method investigated in the 1970s for producing the $^{99}Mo$ parent involved the use of cyclotron technology. As indicated in Helus, F. et al., "System for Routine Production of $^{99m}Tc$ by Thermal Separation Technique", *J. Radiolabelled Compounds and Radiopharmaceuticals,* 13(2):190 (1977), $^{99}Mo$ was produced using cyclotron technology in accordance with the following reaction:

$$^{100}Mo(p,d)^{99}Mo \tag{3}$$

However, this approach generated various side reactions which adversely affected product purity levels.

Current research activities have involved the use of electron linear accelerator technology to generate high energy "bremsstrahlung" (e.g. photoneutrons or "photons") for $^{99}Mo$ production. The following nuclear reactions are involved in this process (wherein $E_t$=the reaction threshold):

$$^{100}Mo(\gamma,n)^{99}Mo \quad (E_t=9.1\ MeV)\ (4)$$

$$^{100}Mo(\gamma,p)^{99}Nb\ (T_{1/2}=15\ sec.) \rightarrow {}^{99}Mo \quad (E_t=16.5\ MeV)\ (5)$$

$$^{100}Mo(\gamma,p)^{99m}Nb\ (T_{1/2}=2.6\ min.) \rightarrow {}^{99}Mo \quad (E_t=16.9\ MeV)\ (6)$$

$$^{100}Mo(n,2n)^{99}Mo \quad (E_t=8.3\ MeV)\ (7)$$

$$^{98}Mo(n,\gamma)99Mo \quad (8)$$

Additional information regarding these reactions and the basic processes for generating $^{99}Mo$ using accelerator technology is disclosed in Davydov, M., et al., "Preparation of $^{99}Mo$ and $^{99m}Tc$ in Electron Accelerators",*Radiokhimiya,* 35(5):91–96(September–October 1993) which is incorporated herein by reference. While Davydov et al. presents the details of accelerator-produced $^{99}Mo$, it does not describe methods or procedures for separating the $^{99}Mo$ parent from its $^{99m}Tc$ daughter as discussed below which is an important and unique aspect of the present invention.

With continued reference to the foregoing process, the photons or bremsstrahlung will need to exceed the threshold energy for the 8.3MeV photoneutron reaction listed in equation (4) which involves $^{100}Mo(\gamma,n)^{99}Mo$. Alternatively, bremsstrahlung having energy levels above 10.6 MeV may likewise induce the secondary reactions set forth in equations (5) and (6) which involve $^{100}Mo(\gamma,p)^{99}Nb$ and $^{100}Mo(\gamma,p)^{99m}Nb$. Both of these reactions produce products which beta-decay to $^{99}Mo$ very quickly as outlined above. If the bremsstrahlung are at other energy levels (e.g. in the range of 14–20 MeV), they can induce double neutron or proton emission. However, these reactions both produce stable $^{98}Mo$ and do not generate significant amounts of impurities.

Accordingly, the use of particle accelerator technology to manufacture $^{99}Mo$ provides many benefits compared with conventional reactor systems using high enriched uranium. These benefits include reduced operating costs, improved safety, and the avoidance of long-term nuclear waste generation. However, regardless of which method is used to produce $^{99}Mo$, a need remains for an effective and rapid procedure for separating the desired $^{99m}Tc$ daughter compositions from the $^{99}Mo$ parent. In the past, many different methods have been employed to separate $^{99m}Tc$ compositions from $^{99}Mo$ products. Some of these processes use multi-step chemical procedures which are cost intensive and of limited effectiveness. For example, in situations involving the reactor-based generation of "fission moly" (e.g. using the following reaction: $^{235}U(n,fission)^{99}Mo$), the resulting $^{99}Mo$ product is processed using chromatographic techniques to isolate the desired $^{99m}Tc$ compositions. Specifically, the fission product is treated using an alumina column in which molybdate ions ($^{99}MoO_4^{-2}$) are tightly bound to the column. Pertechnetate ions ($^{99m}TcO_4-$) generated from the radioactive decay of the parent compound are not bound and eluted using a saline solution.

Alternative methods for separating and isolating the desired $^{99m}Tc$ compositions have also been investigated. For example, a technique known as "sublimation separation" has been employed. This process is discussed in U.S. Pat. No. 3,833,469 and initially involves the production of a low specific activity $^{99}MoO_3$ product using nuclear reactor technology as previously described. The $^{99}MoO_3$ product (which is pulverized to form a powder and is not treated in any other manner prior to further processing) is then heated inside a tube furnace to a relatively high temperature within a broad range of about 750°–950° C. in order to vaporize and release the desired $^{99m}Tc$ compositions. The $^{99m}Tc$ compositions are carried through the system using a flowing stream of gas (e.g. $O_{2(g)}$). To completely separate and isolate the desired $^{99m}Tc$ compositions, it is necessary to pass the gaseous product through a filter at the end of the system which may be manufactured from numerous compositions including silica wool, nickel, and stainless steel. The filter must be maintained at a temperature of at least 310° C. which is above the boiling point of the vaporized $^{99m}Tc$ composition, namely, $^{99m}Tc_2O_7$. The heated filter is specifically designed to trap considerable amounts of residual vaporized $^{99}MoO_3$ compositions which are generated during the foregoing process. These materials, if not retained, will contaminate the final $^{99m}Tc$ product. The gaseous composition which passes through the filter is then treated in an external condenser for recovery of the desired $^{99m}Tc$ composition. As noted above, this process is specifically designed for use with low specific activity reactor-produced $^{99}MoO_3$ products. This situation exists because of the ease of irradiating a substantial mass of $^{98}MoO_3$ in a reactor, combined with the fact that oxygen does not form any long-lived activation products under neutron irradiation. Because appreciable quantities of vaporized $^{99}MoO_3$ are generated as undesired by-products in the foregoing procedure and conventional sublimation processes in general, $^{99m}Tc$ recovery levels rarely exceed about 50%, along with decreased purity levels in the final product. Thus, it is desirable to avoid the production of substantial amounts of vaporized $^{99}MoO_3$by-products in order to achieve an efficient, low temperature sublimation process. This goal is accomplished in unique and highly-effective manner in the present invention as discussed further below which involves a special treatment method associated with the initial $^{99}Mo$ metal starting materials. The claimed treatment method represents a clear and substantial departure from prior processing methods. In particular, it substantially avoids the production of vaporized $^{99}MoO_3$ by-products during the separation and isolation of desired $^{99m}Tc$ materials.

With continued reference to the reactor-based procedures described above, production methods using reactor-generated $^{99}MoO_3$ compositions are expensive, labor-intensive, and produce significant amounts of hazardous nuclear waste. Likewise, the sublimation method discussed-above requires a heated filter system that increases the complexity of the entire process and reduces recovery efficiency. While the foregoing method can be employed to isolate desired $^{99m}Tc$ compositions, tests conducted using this method have rarely produced recovery levels exceeding about 50% as previously noted. Further information on this technique and related sublimation processes is presented in the following articles: Boyd, R., "Molybdenum-99: Technetium-99m Generator", *Radiochimica Acta,* 30(3):123–145 (1982); and Boyd, R., "Technetium-99m Generators—The Available Options", *Int. J. Appl. Radiat. Iso.*,33:801–809(1982).

A considerable amount of related work was conducted in Czechoslovakia in the mid-1970s concerning the use of powdered $^{99}Mo$ sample materials combined with $SiO_2$ grit, presumably to increase the transpiration flow within the sample. This work is discussed in the following articles: Rusek V. et al., "Thermal Separation of $^{99m}Tc$ from Molybdenum Trioxide; I. Separation of $^{99m}Tc$ from Molybdenum Trioxide at Temperatures Below 650° C.", *Radiochem. Radioanal. Letters,*20(1):15–22 (1974); Vlcek, J., et al., "Thermal Separation of $^{99m}Tc$ from Molybdenum Trioxide; II. Separation of $^{99m}Tc$ from Molybdenum Trioxide at Temperatures Above 650° C.", *Radiochem. Radioanal. Letters,* 20(1):23–31 (1974); Machan, V., et al., "Thermal Separation of $^{99m}Tc$ from Molybdenum Trioxide; III. Diffusion Separation of $^{99m}Tc$ from Molybdenum Trioxide from the Standpoint of its Possible Use in Technetium Generator", *Radiochem. Radioanal. Letters,* 20(1):33–40 (1974); Vlcek, V., et al., "Thermal Separation of $^{99m}Tc$ from Molybdenum Trioxide; IV. Diffusion of $^{99m}Tc$ from Molybdenum Trioxide: Application for Greater Amounts of $MoO_3$", *Radiochem. Radioanal. Letters,* 25(3):173–178(1976); and Rusek, V. et al., "Thermal Separation of $^{99m}Tc$ from Molybdenum Trioxide; V. Thermal Separation of $^{99m}Tc$ from Molybdenum Trioxide using a Carrier-Gas", *Radiochem. Radioanal. Letters,* 25(3):179–186 (1976).

Tests conducted in Germany in the late 1970s involved a different approach in which $^{99}Mo$ sample materials were completely vaporized at very high temperatures (e.g. 1100° C.) using a specialized multi-oven system. The test samples were transported in an alternating manner between two oven sections in a separation column as discussed in Helus F., et al., "System for Routine Production of $^{99m}Tc$ by Thermal Separation Technique", *J. Radiolabelled Compounds and Radiopharmaceuticals,* 13(2):190 (1977).

As described in Hungarian Patent No. 169,575 (dated Jul. 11, 1974) a different approach was adopted in which a sample mixture was prepared by combining $TiO_2$ and $^{99}MoO_3$ to create a specialized combination of ingredients which allegedly produced a greater release of $^{99m}Tc$ at lower temperatures. This combination or mixture included a 1:1 ratio of Ti atoms to Mo atoms. However, it appears that the claimed process could only achieve about a 50% recovery rate. Further information regarding the foregoing procedure is discussed in Zsinka, L., et al., "Recent Development in the Sublimation Generator of $^{99m}Tc$" *J. Labelled Comp. and Radio-pharmaceuticals,* 19(11–12):1573–1574 (1982) and in Zsinka, L., "$^{99m}Tc$ Sublimation Generators", *Radiochimica Acta,* 41(2/3):91–96 (1987). Additional information concerning other sublimation processes of interest is disclosed in the following supplemental references: Tachimori, S. et al., "Diffusion of $^{99m}Tc$ in Neutron Irradiated Molybdenum Trioxide and its Application to Separation" *J. Nuc. Sci. and Tech.,* 8(6):295–301 (June 1971); Hupf, H. et al., "Sublimation as a Separation system for Radionuclide Generators: $^{99}Mo$–$^{99m}Tc$, A Working Example" *Southern Med. J.,* 64(11):1432(November 1971); and Colombetti, L. et al., "Study of the Purity of $^{99m}Tc$ Sublimed from Fission $^{99}Mo$ and the Radiation Dose from the Impurities" *Int. J. Appl. Rad. Iso.,* 25:35–41 (1974).

Finally, an alternative, non-sublimation process for isolating $^{99m}Tc$ compositions involves solvent extraction using, for example, methyl ethyl ketone. This method (which uses substantial amounts of organic extractants) is further discussed in Boyd, R., "Molybdenum-99: Technetium-99m Generator", *Radiochimica Acta,* 30(3):123–145 (1982); Molinski, V., "A Review of $^{99m}Tc$ Generator Technology", *Int. J. Appl. Radiat. Iso.,* 33:811–819 (1982); and Toren, D. et al., "Automatic Production of $^{99m}Tc$ for Pharmaceutical Use" *J. Nuc. Med.,* 11(6):368–369 (1970).

Notwithstanding the methods described above, a need remains for a $^{99m}Tc$ production method in which the parent nuclide ($^{99}Mo$) is manufactured in a cost-effective and safe manner without the generation of hazardous nuclear wastes, followed by efficient separation of the desired $^{99m}Tc$ compositions from the parent with a high recovery level. A need likewise remains for a low-temperature $^{99m}Tc$ production method in which the generation of undesired vaporized $^{99}MoO_3$ is avoided so that maximum $^{99m}Tc$ yields and purity levels are achieved. This need is especially important in view of the increased demand for $^{99m}Tc$ compositions as previously noted. With more than ten million $^{99m}Tc$-based scans being conducted annually in the United States at the present time, the current United States market for $^{99m}Tc$ compositions is about $100,000,000 per year for deliveries of about 500 Ci per day of $^{99m}Tc$. The present invention satisfies this need in a highly effective manner which overcomes the problems and disadvantages described above. In particular, the claimed method optimizes the recovery process without the need for uranium-generated $^{99}Mo$ compositions or supplemental separation systems (e.g. filter units). The claimed invention therefore represents an advance in the art of $^{99m}Tc$ recovery which provides the following benefits: (1) the production of substantial yields of $^{99m}Tc$ in a low-temperature thermal isolation process without the corresponding generation of undesired vaporized $^{99}MoO_3$ by-products; (2) the ability to produce substantial $^{99m}Tc$ yields without using reactor-based uranium processes; (3) the isolation of $^{99m}Tc$ compositions from $^{99}Mo$ products in a manner which avoids losses caused by incomplete separation of these materials; (4) generation of the desired $^{99m}Tc$ compositions using a procedure which is cost effective, rapid, safe, and avoids the production of hazardous, long-term nuclear wastes; (5) the development of a method which uses a controlled condensation system to provide a high product purity level with a minimal number of operational steps; (6) the use of a simplified production system that does not require supplemental vapor filtration components and other sub-systems for the removal of waste $^{99}MoO_3$ by-products; (7) the ability to manufacture desired $^{99m}Tc$ compositions using a minimal amount of equipment; (8) the production of $^{99m}Tc$ reaction products at higher efficiency rates and purity levels compared with conventional thermal processes; and (9) the effective generation of $^{99m}Tc$ reaction products using low activity level starting materials. Accordingly, the present invention represents a significant advance in the art of $^{99m}Tc$ production. Further information regarding the invention and its capabilities will be provided below.

SUMMARY OF THE INVENTION

It is an object of the present invention to provide a highly effective method for producing and separating $^{99m}Tc$ compositions from parent $^{99}Mo$ products.

It is another object of the invention to provide an improved method for producing and separating $^{99m}Tc$ compositions from $^{99}Mo$ materials which avoids the production of vaporized $^{99}MoO_3$ by-products during $^{99m}Tc$ separation so that improved yields and purity levels can be achieved.

It is another object of the invention to provide an improved method for producing and separating $^{99m}Tc$ compositions from $^{99}Mo$ materials which uses sublimation technology at low temperature levels so that the generation of vaporized $^{99}MoO_3$ by-products is further avoided as described above.

It is another object of the invention to provide an improved method for producing and separating $^{99m}Tc$ compositions from $^{99}Mo$ materials which involves the manufacture of unique, high-surface-area $^{99}MoO_3$ crystals from $^{99}Mo$ metal which further facilitates the production of $^{99m}Tc$ compositions without the generation of vaporized $^{99}MoO_3$ by-products.

It is another object of the invention to provide an improved method for producing and separating $^{99m}Tc$ compositions from $^{99}$Mo products in which the $^{99}$Mo products (consisting of $^{99}MoO_3$) are generated in a manner which avoids the use of nuclear reactor-based fission systems and the corresponding generation of long-term nuclear wastes.

It is another object of the invention to provide an improved method for producing and separating $^{99m}$Tc compositions from $^{99}$Mo products in which the $^{99}$Mo products are manufactured using particle (e.g. electron) accelerator technology.

It is another object of the invention to provide an improved method for producing and separating $^{99m}$Tc compositions from $^{99}$Mo products in which a high level of separation efficiency is achieved using a minimal number of process steps.

It is a further object of the invention to provide an improved method for producing and separating $^{99m}$Tc compositions from $^{99}$Mo products which avoids the use of required supplemental separation systems, including heated vapor filtration units and the like.

It is a further object of the invention to provide a method for producing and separating $^{99m}$Tc compositions from $^{99}$Mo products in which high-purity final $^{99m}$Tc compositions are generated in substantial quantities.

It is a still further object of the invention to provide a method for producing and separating $^{99m}$Tc compositions from $^{99}$Mo products which involves minimal costs and operating expenses.

It is a still further object of the invention to provide a method for producing and separating $^{99m}$Tc compositions from $^{99}$Mo products which is accomplished in a reaction chamber of minimal complexity using a design that allows precise internal temperature control to be achieved.

It is a still further object of the invention to provide a method for producing and separating $^{99m}$Tc compositions from $^{99}$Mo products which is effectively accomplished using low activity level starting materials.

It is an even further object of the invention to provide a method for producing and separating $^{99m}$Tc compositions from $^{99}$Mo products which is capable of rapid, on-demand delivery of the desired $^{99m}$Tc compositions in a manner which achieves optimum results from a technical, economic, and purity standpoint.

In accordance with the foregoing objects, the present invention involves a unique and highly efficient method for producing, separating, and isolating $^{99m}$Tc compositions (e.g. $^{99m}$Tc and/or $^{99m}$Tc-containing compounds) from $^{99}$Mo-containing materials (e.g. $^{99}MoO_3$). The claimed process is characterized by a high level of separation efficiency which enables the production of a desired $^{99m}$Tc product in a rapid and effective manner. The present invention also uses a unique, crystalline $^{99}MoO_3$ starting material which facilitates the production of $^{99m}$Tc compositions in a low temperature sublimation process which avoids the production of vaporized $^{99}MoO_3$ during sublimation. As a result, a highly pure $^{99m}$Tc final product can be generated. A brief overview of the basic aspects of the claimed invention will now be provided. More specific information, details, definitions, and other factors of importance will be presented in the section entitled "Detailed Description of Preferred Embodiments" set forth below.

To implement the claimed process, an initial supply of $^{99}$Mo metal is first provided. Production of the initial supply of $^{99}$Mo metal may be accomplished in many ways, although a preferred and unique embodiment of the present invention involves the use of particle accelerator technology to generate this material. The term "particle accelerator technology" will be defined below and basically involves the use of a selected particle (e.g. electron) accelerator system to produce the desired starting materials. Likewise, the term "particle accelerator" may encompass the use of both linear accelerator units as discussed further below and non-linear accelerator systems (e.g. conventional systems known as "racetrack" accelerators). The use of particle accelerator technology for this purpose avoids the need for expensive nuclear reactors and the long-term (e.g. long half-life) nuclear wastes associated therewith. While the use of particle accelerator technology in the claimed process is preferred, unique, and represents a significant development, other processes may also be employed to generate the $^{99}$Mo starting materials in this invention as noted above including cyclotron-type (proton-based) methods. Accordingly, the present invention shall not be limited to any particular methods for generating the required starting materials.

In a preferred embodiment, a particle accelerator apparatus of standard design (optimally an electron-based linear accelerator) is provided which is supplied with a portion of enriched $^{100}$Mo metal to be used as a target. Best results are achieved within an enrichment range of about 60–100%. The use of enriched $^{100}$Mo for this purpose will enable the final $^{99m}$Tc product to be produced in the desired amounts, and will likewise assist in minimizing the generation of impurities. Further information regarding enrichment, the use of enriched $^{100}$Mo metal, and the benefits it provides will be described below. Thereafter, in a preferred embodiment involving the use of an accelerator apparatus, the apparatus is activated in order to generate high energy photons (e.g. "bremsstrahlung") therein. The $^{100}$Mo metal is then irradiated with the high energy photons to produce $^{99}$Mo metal.

Next, the accelerator-generated $^{99}$Mo metal is removed from the particle accelerator apparatus. To produce $^{99}MoO_3$ from the $^{99}$Mo metal, it is dissolved in at least one oxygen-containing primary solvent (e.g. $HNO_3$, $H_2SO_4$, or $H_2O_2$) to generate a solvated $^{99}$Mo product therefrom. The solvated $^{99}$Mo product is thereafter dried (e.g. evaporated) in order to yield a dried $^{99}$Mo compound in the form of a plurality of elongate $^{99}MoO_3$ crystals. Many different methods may be used to evaporate the solvated $^{99}$Mo product, and the present invention shall not be limited to any particular evaporation method for this purpose. In a preferred embodiment, the solvated $^{99}$Mo product is heated at a temperature of about 250°–500° C. for an optimum time period of about 5–60 minutes to generate the $^{99}MoO_3$ crystals, although these parameters may be varied as necessary within the foregoing ranges as determined by preliminary pilot studies on the compositions being processed. The resulting $^{99}MoO_3$ crystals have a thin, elongate, and filamentous character with a substantial amount of exposed surface area which facilitates the evolution of $^{99m}$Tc compounds therefrom in a highly efficient manner during sublimation. These important and unique aspects of the present invention, as well as various physical characteristics of the crystals will be discussed in further detail in the "Detailed Description" section.

It is also important to note that $^{99}MoO_3$ crystal formation in the manner described above produces a crystalline product in which $^{99m}$Tc species are effectively partitioned (e.g. segregated or precipitated on the crystal surface) from other non-$^{99m}$Tc components within the $^{99}MoO_3$ crystals. Segregation in this manner greatly facilitates the complete evolution of $^{99m}$Tc compounds during sublimation without the co-production of vaporized $^{99}MoO_3$ contaminants.

Many different reaction chambers and production systems may be employed to isolate the desired $^{99m}$Tc "daughter"

product from its $^{99}MoO_3$ "parent", with the claimed method not being limited to any specific manufacturing components. However, in a representative and preferred embodiment, the claimed process will be performed in an elongate tubular reaction chamber having a first end, a second end, a side wall, and a passageway through the reaction chamber from the first end to the second end. To achieve optimum results, the side wall of the reaction chamber will be seamless in order to avoid high temperature seals and eliminate undesired recesses or crevices which may trap the final $^{99m}Tc$ product. The reaction chamber further includes (e.g. is divided into) a heating section beginning at the first end, heating means for applying heat to the heating section, an intermediate gas transfer section in fluid communication with the heating section, and a reaction product (e.g. $^{99m}Tc$) collecting section in fluid communication with the intermediate section. As described below, the collecting section is designed to condense and retain the desired $^{99m}Tc$ reaction products therein. The collecting section terminates at the second end of the reaction chamber, with the intermediate section being positioned between the heating section and the reaction product collecting section. In a preferred embodiment, the reaction chamber is designed so that the collecting section at the second end of the chamber is positioned at about a 15°–165° angle (optimally about a 90° angle) relative to the intermediate section. This configuration avoids any undesired heat transfer from the heating and intermediate sections into the collecting section as further discussed below.

In a preferred embodiment, the passageway through the reaction chamber will further include a $^{99}MoO_3$crystal containment vessel therein having an open top portion. The containment vessel is specifically positioned within the heating section. The containment vessel is preferably made of platinum or a platinum alloy. However, other construction materials which may be employed for this purpose include a Ni-Cr alloy, stainless steel, or quartz. These materials may be coated with an optional surface layer of platinum or gold if desired as determined by preliminary tests and discussed further below. The foregoing compositions (especially the platinum materials) are strong, resistant to physical deformation over a wide range of temperatures, and facilitate the heating (sublimation) process associated with the $^{99}MoO_3$ crystals.

Next, the supply of $^{99}MoO_3$ crystals is placed within the heating section in the reaction chamber (e.g. inside the containment vessel). The $^{99}MoO_3$ crystals are then heated in the reaction chamber to a first temperature which is sufficiently high to sublimate the $^{99}MoO_3$ crystals and generate a gaseous mixture which evolves therefrom comprising vaporized $^{99m}TcO_3$ and vaporized $^{99m}TcO_2$. However, the first temperature will be sufficiently low to (1) avoid melting the $^{99}MoO_3$ crystals; and (2) prevent the formation of vaporized $^{99}MoO_3$ during the sublimation process. This aspect of the claimed method and the use of temperature parameters which accomplish these goals is applicable to all embodiments of the invention, regardless of the specific type of heating system which is employed. In a preferred embodiment, the above-listed goals are accomplished by using a first temperature of about 600°–775° C. which is achieved in the reaction chamber using the heating means. However, the specific temperature to be employed within this range will again be determined in accordance with preliminary pilot studies on the materials being processed and other factors, including the type of solvent which is used to generate the solvated $^{99}Mo$ product (discussed further below).

As noted above, the foregoing temperature level will cause a gaseous mixture to evolve from the $^{99}MoO_3$ crystals during sublimation which consists of vaporized $^{99m}TcO_3$and vaporized $^{99m}TcO_2$. A small amount of vaporized $^{99m}Tc_2O_7$ may also be produced. However, it is believed that the amount of any vaporized $^{99m}Tc_2O_7$ in the gaseous mixture will be so small that, for the sake of clarity and convenience, the gaseous mixture at this stage will be designated to only include vaporized $^{99m}TcO_3$ and vaporized $^{99m}TcO_2$. The gaseous mixture is further characterized by the substantially complete absence of vaporized $^{99}MoO_3$ in the mixture. The lack of this contaminant is desired in order to produce a high purity $^{99m}Tc$ final product and avoid the need for additional purification stages in the system. As discussed below, the ability of the present invention to avoid the production of vaporized $^{99}MoO_3$ during sublimation is primarily accomplished by (1) the use $^{99}MoO_3$ in the form of elongate, high-surface-area crystals manufactured by the process described above in which the desired $^{99m}Tc$ species are effectively partitioned in the crystals; and (2) heating of the $^{99}MoO_3$ crystals at low, pre-melting temperatures.

Next, the vaporized $^{99m}TcO_3$ and vaporized $^{99m}TcO_2$ in the gaseous mixture are converted (e.g. oxidized) to a supply of vaporized $^{99m}Tc_2O_7$. This is accomplished in a preferred embodiment of the claimed process by initially providing a supply of an oxygen-containing oxidizing gas which is preferably pre-heated to a temperature of about 20°–775° C. prior to entry into the reaction chamber. Representative oxygen-containing oxidizing gases include but are not limited to $O_{2(g)}$, air, $O_{3(g)}$, $H_2O_{2(g)}$, or $NO_{2(g)}$, with $O_{2(g)}$ providing best results. Many different methods may be employed to heat the gas, including the use of an external heating unit or a gas delivery unit which is positioned adjacent the reaction chamber so that counter-current heating may be achieved as discussed below. The supply of oxidizing gas (after pre-heating) is then introduced into the reaction chamber and passed over the $^{99}MoO_3$crystals at a preferred flow rate of about 10–100 std. cc/min during evolution of the gaseous mixture from the $^{99}MoO_3$ crystals. Passage of the oxidizing gas over the heated $^{99}MoO_3$ crystals in this manner forms a gaseous stream consisting of the oxidizing gas in combination with the gaseous mixture. At this stage, the oxidizing gas oxidizes the vaporized $^{99m}TcO_3$ and vaporized $^{99m}TcO_2$ in the gaseous mixture to form a supply of vaporized $^{99m}TC_2O_7$ from these components. As a result, the gaseous stream will contain vaporized $^{99m}Tc_2O_7$ therein and remaining amounts of the oxidizing gas which are not consumed during oxidation of the vaporized $^{99m}TcO_3$ and vaporized $^{99m}TcO_2$ The gaseous stream then passes through the heating section, the intermediate section (which functions as a gas transfer zone in which a certain degree of transitional cooling occurs) and enters the reaction product collecting section of the reaction chamber. This portion of the reaction chamber is characterized as the "collecting section" since final temperature levels are achieved therein which are sufficient to enable condensation (desublimation) of the vaporized $^{99m}Tc_2O_7$ from the gaseous stream. In this manner, the final $^{99m}Tc$-containing reaction product can be isolated and collected as discussed further below.

As the gaseous stream passes through the intermediate section, it experiences a progressive decrease in temperature as the distance from the heating section increases. In particular, the gaseous stream typically experiences a reduction in temperature from about 600°–775° C. when the stream leaves the heating section and enters the intermediate section to a transitional temperature of about 300°–400 C.

when the gaseous stream leaves the intermediate section. Next, the gaseous stream (and the vaporized $^{99m}Tc_2O_7$ therein) is cooled to a final temperature sufficient to condense and remove the vaporized $^{99m}Tc_2O_7$ from the gaseous stream so that a condensed $^{99m}$Tc-containing reaction product is produced. Cooling and condensation of the vaporized $^{99m}Tc_2O_7$ takes place within the reaction product collecting section of the reaction chamber. In particular, the collecting section of the chamber functions as a condensation stage in the claimed process. The gaseous stream is specifically cooled within the collecting section to a final temperature of about 20°–80° C. This step enables the vaporized $^{99m}Tc_2O_7$ within the gaseous stream to be condensed and removed from the stream so that a condensed $^{99m}$Tc-containing reaction product is generated inside the collecting section. The condensed $^{99m}$Tc-containing reaction product is then collected (removed) from the collecting section and processed as desired in accordance with the intended use of the final $^{99m}$Tc product. Further information concerning the collection process will be discussed in greater detail below.

As a result of the foregoing sublimation process, a residual $^{99}MoO_3$-containing reaction product will typically remain within the heating section of the reaction chamber after the desired production cycle is completed. The $^{99m}$Tc isolation process described above is typically undertaken at discrete intervals or "milkings" to obtain specific on-demand quantities of the $^{99m}$Tc-containing reaction product. On-demand processing is undertaken since the $^{99m}$Tc-containing reaction product is subject to rapid decay and deterioration with a half-life of about six hours. For this reason, it is undesirable to generate excess amounts of the $^{99m}$Tc-containing reaction product which are not needed for immediate use. Accordingly, in an on-demand system, the residual $^{99}MoO_3$-containing reaction product which remains after system deactivation will normally contain significant amounts of $^{99m}$Tc compositions therein. In accordance with a preferred embodiment of the invention, the residual $^{99}MoO_3$-containing reaction product is reprocessed so that it can be used again when needed. Tests have shown that reprocessing of the residual $^{99}MoO_3$-containing reaction product as described below will provide maximum yields of the desired $^{99m}$Tc compositions compared with situations in which the reaction product is not reprocessed and simply reheated without removal from the sublimation system. Reprocessing is preferably accomplished by first collecting the residual $^{99}MoO_3$-containing reaction product from the heating section of the reaction chamber after deactivation of the system. Next, the residual $^{99}MoO_3$-containing reaction product is dissolved in at least one secondary solvent to produce a dissolved $^{99}MoO_3$ product. Representative compositions which may be employed as the secondary solvent include but are not limited to $NH_4OH$ or $H_2SO_4$. The dissolved $^{99}MoO_3$ product is then dried (evaporated) to generate a supply of regenerated $^{99}MoO_3$ crystals. Many different methods may be used to dry the dissolved $^{99}MoO_3$ product, and the present invention shall not be limited to any particular evaporation method for this purpose. In a preferred embodiment, the dissolved $^{99}MoO_3$ product is heated at a temperature of about 250°–500° C. for an optimum time period of about 5–60 minutes, although these parameters may be varied as necessary in accordance with preliminary pilot studies on the compositions being processed. The supply of regenerated $^{99}MoO_3$ crystals can then be reused (e.g. resublimated) to produce additional amounts of the $^{99m}$Tc-containing reaction product on-demand in accordance with the procedures outlined above.

The present invention represents a significant advance in the production and separation of $^{99m}$Tc compositions. High yields and purity levels are achieved in a manner which is clearly distinguishable from prior processes. As indicated below, the claimed invention involves many unique steps which provide numerous benefits ranging from improved separation efficiency and purity levels to a lack of long-term nuclear wastes. These and other objects, features, and advantages of the invention shall be discussed below in the following Brief Description of the Drawings and Detailed Description of Preferred Embodiments.

DETAILED DESCRIPTION OF PREFERRED EMBODIMENTS

Figure 1:
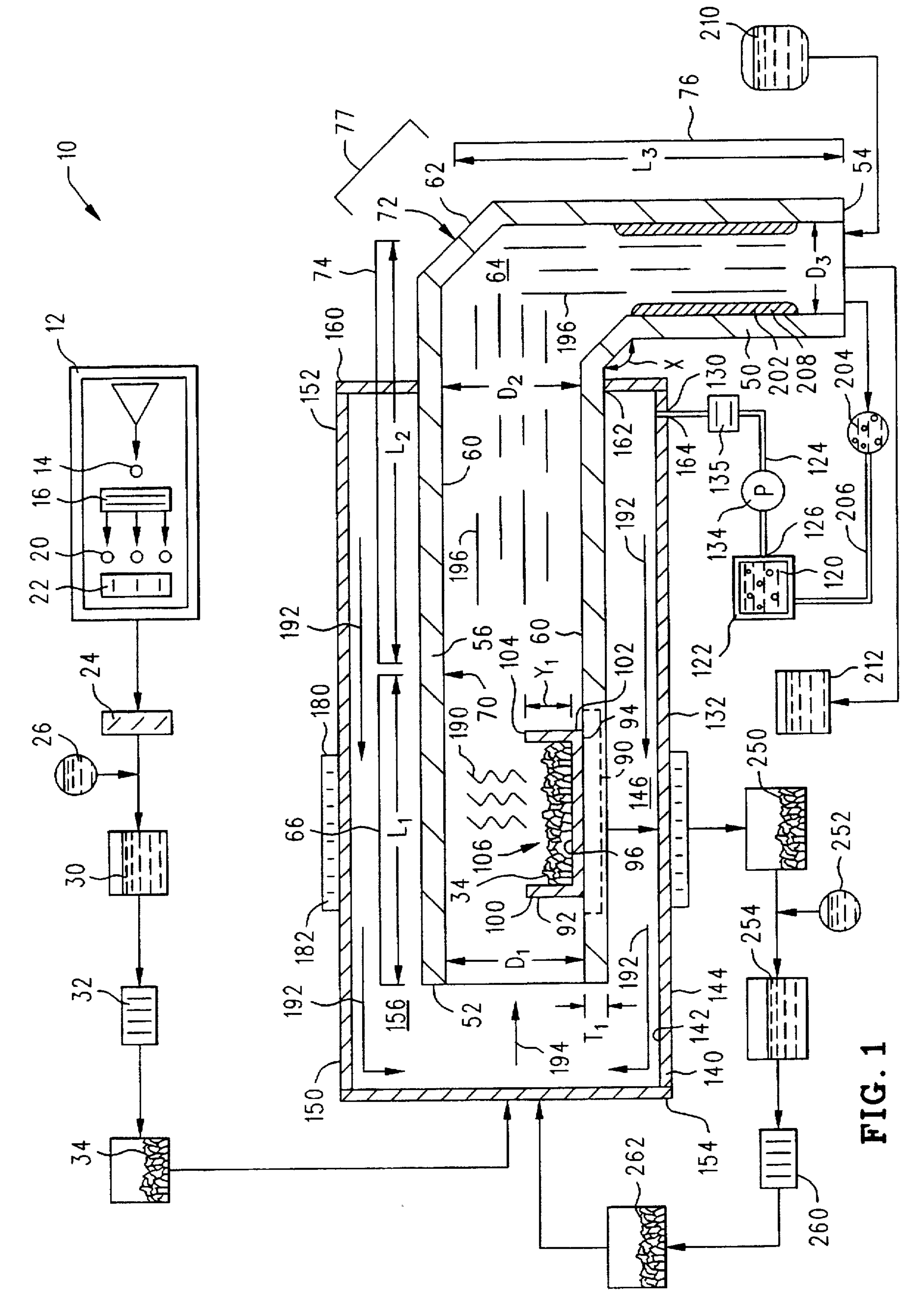
FIG. 1 is a schematic representation (partially in cross-section) of an exemplary processing system which may be used in accordance with the methods of the present invention.

As indicated above, the present invention involves a highly efficient method for producing purified $^{99m}$Tc compositions from $^{99}$Mo starting materials (e.g. crystalline $^{99}MoO_3$). This method is characterized by a number of significant benefits and advantages. The following description will involve preferred embodiments of the invention in which optimum operating parameters are disclosed. However, the claimed invention shall not be limited to the specific parameters provided below which are disclosed for example purposes. The most effective operating conditions for a given situation may be determined in accordance with routine preliminary pilot studies on the specific materials being processed and the equipment to be used for $^{99m}$Tc production.

A. Production of the Crystalline $^{99}MoO_3$ Starting Material

The initial step in the claimed process involves the generation of a $^{99}MoO_3$ starting material which is ultimately treated to recover the desired $^{99m}$Tc compositions therefrom. Production of the $^{99}MoO_3$ starting material is accomplished by the chemical conversion (e.g. oxidation) of a supply of $^{99}$Mo metal into crystalline $^{99}MoO_3$ as further discussed below. To produce the initial supply of $^{99}$Mo metal in accordance with a preferred embodiment of the invention, a $^{100}$Mo metal target is irradiated with accelerated particles (e.g. electrons) using a particle accelerator apparatus. A "particle accelerator apparatus" basically consists of a particle accelerator unit which uses alternating voltages to accelerate electrons, protons, or heavy ions in a straight line. Representative particle (electron) accelerator systems may include a variety of different types ranging from a linear accelerator which accelerates particles in a straight line to a "racetrack" type system which accelerates particles in a circular or oval pathway. In this regard, the present invention shall not be limited to the use of a particular particle accelerator system, although a linear electron accelerator is preferred.

While the use of particle accelerator technology in the claimed methods is preferred, unique, and represents a significant development, other processes may also be employed to generate the initial supply of $^{99}$Mo in this case including cyclotron-type (proton-based) methods. Accordingly, the present invention shall not be restricted to any particular methods for generating the requisite starting materials.

With reference to FIG. 1, a system 10 which is suitable for use in accordance with the claimed invention is illustrated.

A schematically-illustrated particle accelerator apparatus (e.g. an electron-based linear accelerator) is shown in FIG. 1 at reference number 12. Particle accelerators are known in the art for producing various radioactive species, and many different linear and non-linear accelerator systems may be employed for the purposes set forth below. While the present invention shall not be limited to any particular accelerator apparatus as noted above, a representative system suitable for use as the particle accelerator 12 will consist of a 15 kW electron accelerator unit having an MeV rating of up to about 40 MeV. Such a system is commercially available from many sources including Varian Associates of Palo Alto Calif. (USA)—[model "Clinac 35"]. This system has an operational capability of 7 MeV–28 MeV, although in actual use, the system is operated at values of at least 10 MeV or more since about 10 MeV is the threshold energy level which is necessary in the photoneutron reactions of concern in the present invention. Likewise, custom-manufactured electron accelerators having the foregoing capabilities may be obtained from Titan Beta Corporation of Dublin Calif. (USA). While accelerator systems having a lower maximum energy level can be employed to produce the desired materials in accordance with the invention, it is preferred that a particle accelerator 12 be selected which is capable of maintaining energy levels of at least about 20 MeV so that sufficient amounts of the $^{99}$Mo starting materials can be generated.

Production of the $^{99}$Mo starting materials (e.g. $^{99}$Mo metal which is subsequently converted to $^{99}MoO_3$) is accomplished by activating the particle accelerator 12 (e.g. electron linear accelerator) so that "bremsstrahlung" or high energy photons are generated within the accelerator 12 in a conventional manner as discussed in Weidemann, H., *Particle Accelerator Physics*, Springer-Verlag, pp. 25–74 (1993). To accomplish photon generation, the particle accelerator 12 in the preferred embodiment of FIG. 1 delivers electrons (schematically illustrated in FIG. 1 at reference number 14) to a substantially circular high atomic number target member 16 which is about 0.5–5 mm thick, with a diameter of about 1–10 cm. Optimal results will be achieved if the target member 16 is constructed from tungsten, although other materials may also be employed for this purpose (e.g. tantalum). Likewise, target members 16 with different dimensions (e.g. thicknesses) may be used in accordance with preliminary tests on the accelerators and materials of interest. When the electrons 14 strike the target member 16, they generate high energy photons or "bremsstrahlung" (schematically illustrated in FIG. 1 at reference number 20) which are then used to produce the desired $^{99}$Mo metal product.

As indicated above, the claimed process involves the separation of $^{99m}$Tc compositions (defined herein to encompass both $^{99m}$Tc and compounds thereof) from crystalline $^{99}MoO_3$. The crystalline $^{99}MoO_3$ is manufactured in a unique manner which provides numerous benefits as discussed further below. With reference to FIG. 1, a preferred production method used to generate $^{99}MoO_3$ crystals in accordance with the present invention is schematically illustrated. In the embodiment of FIG. 1, the starting material used to generate the desired $^{99}MoO_3$ crystals consists of a $^{100}$Mo-containing target 22 manufactured from $^{100}$Mo metal. The use of $^{100}$Mo metal for this purpose is preferred for many reasons. For example, the use of $^{100}$Mo metal is preferred because the reaction rate of high-energy photons ("bremsstrahlung") during the production of $^{99}$Mo from $^{100}$Mo will be considerably higher compared with processes which use $^{100}$Mo compounds (e.g. $^{100}MoO_3$) instead of $^{100}$Mo metal. Higher reaction rates exist when $^{100}$Mo metal is used because any other materials which are "compounded" with the initial $^{100}$Mo will scatter or absorb the photons and reduce the overall reaction rate. This is particularly true when $^{100}MoO_3$is employed as a starting material instead of $^{100}$Mo metal since three oxygen atoms will compete with each atom of $^{100}$Mo for interaction with the high energy photons. Interaction of the photons with oxygen atoms will generally reduce the energy of a given proportion of the photons over time to an energy level below the 8.3 MeV threshold value for the desired reaction.

A representative target 22 constructed from $^{100}$Mo metal (which is substantially circular in configuration) will have the following dimensions: (1) thickness=about 5–50 mm; (2) diameter=about 5–20 mm; and (3) weight=about 1–150 g. However, these parameters may be experimentally varied as desired in view of many factors including the size and configuration of the selected particle accelerator 12.

To achieve a desired level of $^{99m}$Tc production within the system 10, enriched $^{100}$Mo metal is used in this embodiment to produce the $^{100}$Mo-containing target 22. The terms "enriched" and "enrichment" as used herein involve a known process in which the isotopic ratio of a material is changed to increase the amount of a desired isotope in the composition. The natural abundance of $^{100}$Mo is 9.63%. While this level will work in producing the desired $^{99m}$Tc products associated with the present invention, a greater level of enrichment is preferred in order to ensure that sufficient yields of the final $^{99m}$Tc compositions are generated. To achieve optimum results in this embodiment of the invention, an enrichment level of about 60–100% is desired. The production of enriched $^{100}$Mo at these enrichment levels may be accomplished in many conventional ways. For example, $^{100}$Mo at about a 27% enrichment rate (which will still work but is somewhat less than the optimum values listed above) can be generated using standard nuclear fission processes in accordance with the following reaction: $^{235}$U (n,f)$^{100}$Mo. Other conventional methods for generating enriched $^{100}$Mo at higher enrichment levels include (1) electromagnetic separation in a mass spectrometer or calutron; and (2) gaseous diffusion separation of $MoF_6$. In addition, supplies of enriched $_{100}$Mo at the foregoing enrichment levels may be obtained from government and commercial sources including the Isotope Production and Distribution Program at Oak Ridge National Laboratory of Oak Ridge, Tenn. (USA) and URENCO of Almelo, Netherlands.

In addition to improving $^{99m}$Tc product yields in the system 10, the use of enriched $^{100}$Mo in the $^{100}$Mo-containing target 22 assists in minimizing the production of undesired impurities. These impurities result from (γ,n), (γ,2n), (γ,p), (γ,2p), and (γ,d) reactions involving other stable isotopes of Mo that may be present in the target 22. These are all nuclear reactions which exhibit a threshold energy, and can therefore be minimized by limiting the energy of the selected particle accelerator 12 while increasing its current at a given power output. The main radioimpurities which are produced from these reactions include radioactive isotopes of niobium, molybdenum and zirconium (e.g. $^{93m}$Mo, $^{90}$Mo, $^{96}$Nb, $^{95m}$Nb, $^{95}$Nb, $^{92}$Nb, $^{91m}$Nb $^{90}$Nb, and $^{95}$Zr). Because these radioimpurities result from the presence of non-$^{100}$Mo isotopes as indicated above, it is desired that the target 22 be constructed from $^{100}$Mo metal with as high a $^{100}$Mo enrichment level as possible. Furthermore, the use of enriched $^{100}$Mo generated from nuclear fission processes also provides improved purity levels in the final $^{99m}$Tc products generated by the system 10. Fission product molybdenum has neither $^{92}$Mo or $^{94}$Mo therein, and likewise includes about sixteen times less $^{96}$Mo compared with natural molybdenum. The absence of $^{92}$Mo and $^{94}$Mo entirely eliminates over 50% of all the potential impurity-producing reactions. Likewise, low amounts of $^{96}$Mo also substantially reduce the number of undesired side reactions.

To produce $^{99}$Mo metal from the target 22 comprised of $^{100}$Mo metal, high energy photons 20 generated within the particle accelerator 12 as described above come in contact with the target 22, thereby causing photoneutron, photoproton, and other photonuclear reactions. As a result, $^{99}$Mo metal is generated. This process and the reactions associated therewith are summarized in Davydov, M., et al., "Preparation of $^{99}$Mo and $^{99m}$Tc in Electron Accelerators", *Radiokhimiya*, 35(5):91–96 (September–October 1993) which is incorporated herein by reference as noted above. Specifically, the following reactions as discussed in Davydov, M. et al., *supra*, are involved in the production of $^{99}$Mo metal from $^{100}$Mo metal wherein $E_r$=the reaction threshold:

$$^{100}Mo(\gamma,n)^{99}Mo \quad (E_r=9.1\ MeV)\ (9)$$

$$^{100}Mo(\gamma,p)^{99}Nb\ (T_{1/2}=15\ sec.) \rightarrow {}^{99}Mo \quad (E_r=16.5\ MeV)\ (10)$$

$$^{100}Mo(\gamma,p)^{99m}Nb\ (T_{1/2}=2.6\ min.) \rightarrow {}^{99}Mo \quad (E_r=16.9\ MeV)\ (11)$$

$$^{100}Mo(n,2n)^{99}Mo \quad (E_r=8.3\ MeV)\ (12)$$

$$^{98}Mo(n,\gamma)^{99}Mo \quad (13)$$

While Davydov et al. presents the basic details of accelerator-produced $^{99}$Mo, it does not describe methods or processes for separating the $^{99}$Mo parent from its $^{99m}$Tc daughter as discussed further below which is a key aspect of the present invention.

A preferred irradiation time associated with the target 22 produced from $^{100}$Mo metal is about 24–48 hours using the representative accelerator systems described above. However, this parameter may be varied in accordance with numerous factors including the type of system being employed and its desired output. Irradiation times which are too short (generally less than about 24 hours) will increase the amount of $^{100}$Mo metal required within the system 10, thereby resulting in additional operating costs. Likewise, irradiation times that are too long (generally more than about 48 hours) will produce a greater degree of quality variation and fluctuation in the average Ci output levels associated with the final $^{99m}$Tc product. Use of the foregoing parameters within the system 10 will typically result in a $^{99}$Mo metal product with an activity level at the end of irradiation of about 1–5 Ci of $^{99}$Mo/g of $^{100}$Mo. This level is comparable to the activity levels achieved when "activation moly" is generated by the neutron activation of enriched $^{98}$Mo in high flux nuclear reactors. As discussed in further detail below, even though relatively low activity level $^{99}$Mo is produced using the foregoing procedure, it is a unique and important aspect of the present invention that this initial $^{99}$Mo starting material can nonetheless be used to generate substantial amounts of $^{99m}$Tc product (e.g. an average $^{99m}$Tc composition output of about 20 Ci per day.)

At this stage in the production process, a supply of $^{99}$Mo metal (shown at reference number 24 in FIG. 1) is generated from the $^{100}$Mo-containing target 22. However, as noted above, the $^{99m}$Tc isolation process of the claimed invention involves the use of crystalline $^{99}MoO_3$ as a starting material. Accordingly, the $^{99}$Mo metal 24 must be converted into $^{99}MoO_3$ in a rapid and efficient manner. To accomplish this, the accelerator-generated $^{99}$Mo metal 24 is allowed to stabilize for a rest period of at least about one hour or more. During this stabilization period, low-level radioimpurities having a half-life of less than about several minutes will decay. This process assists in increasing the purity of the $^{99m}$Tc final product. Thereafter, the stabilized $^{99}$Mo metal 24 is dissolved in at least one oxygen-containing primary solvent material 26 to generate a solvated (liquefied) $^{99}$Mo product 30 schematically shown in FIG. 1. In a preferred embodiment, the primary solvent material 26 will consist of 6–9 M $HNO_3$ (optimally heated to a temperature exceeding about 70° C.). However, other compositions may be used for this purpose including but not limited to $H_2SO_4$ (at a free acid concentration of 0.12 M heated to about 100°) or $H_2O_2$. Likewise, the term "oxygen-containing" in connection with the solvent materials shall encompass the use of other solvent materials which do not directly contain oxygen as part of their molecular structure, but instead are in the from of an aqueous solution (e.g. $H_2O$ +solvent) in which oxygen is derived from water molecules in the solution. To produce the solvated $^{99}$Mo product 30, the $^{99}$Mo metal 24 will optimally be combined with the selected primary solvent material 26 in a metal 24 : primary solvent material 26 weight ratio of about 1–5 : 1–25. However, this ratio represents an exemplary embodiment which may be varied in accordance with preliminary pilot studies on the particular materials being processed. The solvated $^{99}$Mo product 30 is then dried (evaporated) in a sealed oven apparatus 32 of conventional design at a temperature of about 250–500° C. for about 5–60 minutes. This process results in the formation of a dried $^{99}$Mo compound consisting of a plurality of elongate, thin, and filamentous $^{99}MoO_3$ crystals schematically illustrated in FIG. 1 at reference number 34. These crystals 34 are then used in the next stage of the $^{99m}$Tc production/isolation process.

The $^{99}MoO_3$crystals 34 provide a number of unique and inventive contributions to the claimed method which will now be discussed. As noted above, each of the crystals 34 has a thin, elongate, and filamentous (e.g. needle-like) character with a high level of exposed surface area. While a certain degree of structural variation will exist from crystal to crystal, a representative crystal 34 will have the following physical and dimensional characteristics: (1) average length=about 100–1000 µm; (2) average width=about 0.1–1.0 µm; and (3) average thickness=about 0.1–1.0 µm. The thin, elongate, and needle-like characteristics of the $^{99}MoO_3$ crystals 34 as described above provide numerous advantages and constitute an inventive aspect of primary importance. Specifically, these characteristics result in a crystalline structure with a substantial amount of exposed surface area which facilitates the evolution of $^{99m}$Tc compounds therefrom in a highly efficient manner during sublimation. Likewise, the thin, needle-like characteristics of the crystals 34 provide a shortened diffusion path for the release of volatile $^{99m}$Tc compounds compared with the use of pulverized $^{99}MoO_3$ bulk materials. The presence of a shortened diffusion path, as well as the increased level of surface area enable the desired $^{99m}$Tc products to evolve in a more rapid and complete manner at lower, pre-melting temperatures. Lower operating temperatures provide an equally important benefit, namely, the ability to generate the desired final $^{99m}$Tc compositions while avoiding the production of undesired vaporized $^{99}MoO_3$ which typically results when higher temperatures are employed. The presence of vaporized $^{99}MoO_3$ in the system 10 will contaminate the final $^{99m}$Tc product unless the $^{99}MoO_3$ is removed using additional steps and procedures (e.g. additional condensation/desublimation stages). These additional stages can increase the cost and complexity of the production system. Finally, in accordance with a current understanding of the chemical and physical processes associated with formation of the $^{99}MoO_3$ crystals 34, it appears that the desired $^{99m}Tc$ radioactive species within the crystals 34 are effectively partitioned (e.g. segregated or precipitated on the surfaces of the crystals 34) from other non-$^{99m}Tc$ components in the crystals 34. This situation greatly facilitates the rapid and complete evolution of desired $^{99m}Tc$ compounds during sublimation without the co-production of vaporized $^{99}MoO_3$ contaminants. Accordingly, the production and low-temperature sublimation of crystalline $^{99}MoO_3$ (compared with other forms of $^{99}MoO_3$) constitute unique aspects of the present invention which provide numerous benefits as outlined above. In addition, the use of particle accelerator technology to generate the initial $^{99}Mo$ metal in the claimed process also represents a departure from conventional methods, especially those involving nuclear reactors which generate "fission moly". The use of a particle (e.g. electron) accelerator 12 at this stage in the system 10 reduces the costs, labor, and risks compared with reactor-produced (e.g. fission-generated) $^{99}Mo$ products. Likewise, the present method avoids the generation of large amounts of long-term radioactive wastes. While various waste products may be created using particle accelerator technology as described above (depending to a certain extent on the level of enrichment associated with the initial $^{100}Mo$ metal starting material), only small amounts (e.g. typically less than millicurie quantities) of low-level wastes are generated. All of these wastes have less than about 120 day half-lives. For this reason, the application of particle accelerator technology to a $^{99m}Tc$ purification process is an important development and a clear departure from prior fission-based methods.

B. A System for Separating and Isolating $^{99m}Tc$ Reaction Products from Crystalline $^{99}MoO_3$ This stage of the claimed process is schematically illustrated in FIG. 1. It specifically involves the separation and isolation of $^{99m}Tc$ "daughter" compositions from the "parent" $^{99}MoO_3$ crystals 34. The methods and procedures used to accomplish separation represent a substantial improvement over prior methods and enable the production of final $^{99m}Tc$ products with high purity levels as discussed below.

With reference to FIG. 1, an elongate tubular reaction chamber 50 is provided in which $^{99m}Tc$ separation is accomplished. While many different configurations, dimensions, materials, and components may be used in connection with the reaction chamber 50, a representative and preferred chamber 50 will now be described. The term "tubular" as used herein shall generally signify an elongate structure having a bore or passageway therethrough surrounded by a continuous wall as discussed below. While the cross-sectional configuration of the reaction chamber 50 is preferably circular in order to facilitate the removal of desired materials from the internal regions of the chamber 50, numerous alternative cross-sectional configurations may be employed (e.g. square, rectangular, and the like). In a preferred embodiment, the reaction chamber 50 is preferably of single piece, seamless construction in order to avoid undesired recesses, crevices, and the like which can trap various reaction products and decrease product yields. Regarding construction materials used to manufacture the reaction chamber 50, many different compositions may be employed, with the present invention not being limited to any particular materials for this purpose. However, exemplary and preferred construction materials suitable for use in producing the reaction chamber 50 will consist of quartz, an alloy of Ni—Cr, or stainless steel. A optional protective layer of platinum or gold may be applied to the interior surfaces of the chamber 50 at a thickness of about 0.025–2.5 mm if desired as determined by preliminary tests in order to protect the chamber 50 from corrosion. However, it is a unique feature of this invention that any corrosion normally experienced from contact with $^{99}MoO_3$ is eliminated by limiting the temperature of the $^{99}MoO_3$ to below its melting point.

With continued reference to FIG. 1, a schematic (cross-sectional) illustration of the reaction chamber 50 is provided. The chamber 50 specifically includes an open first end 52, an open second end 54, and a continuous annular side wall 56. In a preferred embodiment, the side wall 56 is of seamless construction (as noted above) and has a preferred thickness "$T_1$" (FIG. 1) of about 0.5–10 mm. The thickness "$T_1$" of the side wall 56 will be uniform along the entire length of the reaction chamber 50 unless otherwise indicated or illustrated in FIG. 1. The side wall 56 also has an inner surface 60 and an outer surface 62 as shown in FIG. 1.

Positioned within the reaction chamber 50 and entirely surrounded by the side wall 56 is an internal passageway 64 which extends continuously through the reaction chamber 50 from the first end 52 to the second end 54. The diameter values associated with the passageway 64 through the reaction chamber 50 will be discussed in further detail below. With reference to FIG. 1, the elongate tubular reaction chamber 50 is divided into three main sections, each performing a unique and distinctive function which clearly distinguishes the present method from prior processing systems. Specifically, the reaction chamber 50 first includes a heating section 66 which begins at the first end 52 of the chamber 50 and ends at position 70 shown in FIG. 1. In a preferred embodiment, the heating section 66 will have a length "$L_1$" (FIG. 1) of about 1–100 cm from the first end 52 of the chamber 50 to position 70 as shown, depending on whether a small, laboratory-scale testing system 10 or a large scale commercial system 10 is desired. The diameter "$D_1$" (FIG. 1) of the passageway 64 within the heating section 66 in an exemplary embodiment of the present invention will be about 1–10 cm which is sufficient to accommodate a containment vessel of variable size therein (discussed below) for retaining the initial supply of $^{99}MoO_3$ crystals 34 within the reaction chamber 50. A heating system (e.g. heating means) is also associated with the heating section 66 to apply the necessary amount of thermal energy to the initial $^{99}MoO_3$ crystals 34 as described in further detail below.

Beginning at position 70 of the reaction chamber 50 and terminating at position 72 illustrated in FIG. 1 is an intermediate section 74. The intermediate section 74 functions as a gas transfer stage in which gaseous materials in the system 10 (discussed in detail below) are transferred from the heating section 66 to the final sections of the system where the desired $^{99m}Tc$ reaction products are isolated by condensation (desublimation). In addition, the intermediate section 74 also allows the gaseous materials in the system 10 to undergo a certain degree of transitional cooling. As described further below, the gaseous materials within the system 10 will experience a progressive decrease in temperature as they move away from the heating section 66 and through the intermediate section 74.

The intermediate section 74 is in fluid communication with the heating section 66 as shown. In a preferred embodiment, the intermediate section 74 will have a length "$L_2$"(FIG. 1) of about 10–100 cm from position 70 to position 72. In addition, the diameter "$D_2$" (FIG. 1) of the passageway 64 within the intermediate section 74 will be about 1–10 cm in an exemplary and preferred embodiment. However, because the intermediate section 74 is not being used to perform a direct separation (e.g. by condensation/desublimation) of any particular components in the gaseous materials travelling through the system 10, the length "$L_2$" and diameter "$D_2$" of the intermediate section 74 are not critical. Instead, the length "$L_2$" and diameter "$D_2$" of the intermediate section 74 will be selected in view of many considerations including the size of the system 10 and amount of transitional cooling which is desired prior to the final $^{99m}Tc$ condensation stages. A greater degree of transitional cooling within the intermediate section 74 will enable a smaller (e.g. shorter) final condensation/collection section to be used at the second end 54 of the reaction chamber 50. Likewise, the need for a long intermediate section 74 may be diminished if a corresponding increase is made to the length or overall cooling capacity of the final collection (condensation) sections of the system 10. For this reason, the length "$L_2$" and diameter "$D_2$" of the intermediate section 74 may be varied as needed within the foregoing ranges in accordance with the desired operating characteristics and capabilities of the system 10.

Reconfiguration of the final stages of the system 10 may involve appropriate size adjustments to the final sections of the reaction chamber 50 or the addition of auxiliary cooling systems at the second end 54 of the chamber 50 including chiller coils and the like. In this regard, the present invention shall not be limited to any particular sizes, dimensions, and configurations in connection with the various sections of the reaction chamber 50, provided that the necessary sublimation and condensation processes (discussed below) are able to occur with a maximum degree of efficiency. However, the ranges listed above for "$L_2$" and "$D_2$" in connection with the intermediate section 74 represent preferred embodiments which will provide effective results in accordance with the operating procedures summarized below.

Beginning at position 72 within the reaction chamber 50 and terminating at the second end 54 is the final section of the chamber 50 which consists of a reaction product collecting section 76. The collecting section 76 functions a main condensation stage in which sufficiently low temperatures are reached to enable condensation of the gaseous $^{99m}Tc$ reaction products therein. As shown in FIG. 1, the intermediate section 74 is positioned between the heating section 66 and reaction product collecting section 76 to complete the three-stage reaction chamber 50. Likewise, the collecting section 76 is in fluid communication with the intermediate section 74 as illustrated. In a preferred embodiment, the collecting section 76 will have a length "$L_3$" (FIG. 1) of about 1–100 cm from position 72 to the second end 54 of the reaction chamber 50. The operational capabilities of the collecting section 76 will be discussed further below. In addition, the diameter "$D_3$" of the passageway 64 within the section 76 will be about 0.1–5 cm in a representative embodiment. However, these values may again be varied as needed in accordance with a variety of operational factors as determined by preliminary investigation.

With reference to FIG. 1, the point of transition between the intermediate section 74 and the reaction product collecting section 76 (e.g. at position 72) will involve a bevelled section 77 which is designed to avoid sharp angles within the passageway 64 so that the trapping of condensed reaction products is avoided. For the purposes of this embodiment, the transition between the sections 74, 76 is considered to take place at position 72 which is substantially in the middle of the bevelled section 77. The length values $L_2$ and $L_3$ associated with sections 74, 76 as shown in FIG. 1 are measured in a manner which takes into consideration the fact that the approximate transition point between the sections 74, 76 occurs at position 72 within the bevelled section 77.

Regarding the basic design of the reaction chamber 50, it may be manufactured so that it is entirely linear (e.g. 180°) with the first end 52 of the chamber 50 being in axial alignment with the second end 54. However, in the embodiment of FIG. 1, the reaction product collecting section 76 is positioned at an angle "X" of about 15°–165° (optimally about 90° as illustrated in FIG. 1) relative to the intermediate section 74 and heating section 66 (since the heating section 66 is in axial alignment with the intermediate section 74 in the embodiment of FIG. 1). In accordance with this angular relationship between sections 74, 76, the "line of sight" between the intermediate section 74 and the reaction product collecting section 76 is interrupted. This relationship is designed to create separate and distinct temperature gradients in sections 74, 76 of the chamber 50 so that condensation can occur in a rapid and complete manner within the collecting section 76 and not in upstream portions of the system 10. To achieve the necessary degree of cooling within the collecting section 76, the carryover of thermal energy from earlier sections of the system 10 (e.g. the heating section 66 and the intermediate section 74) should be avoided. Otherwise, the size requirements associated with the collecting section 76 and the need for auxiliary cooling systems at the second end 54 of the reaction chamber 50 would correspondingly increase. It is therefore important to avoid the uncontrolled transfer of thermal energy (e.g. heat) from the heating section 66 and intermediate section 74 to downstream portions of the system 10 (e.g. the collecting section 76). This goal is accomplished in the embodiment of FIG. 1 by positioning the collecting section 76 at angle "X" relative to the intermediate section 74 as described above. In this manner, convective and radiant heat transfer from the heating section 66 and intermediate section 74 into the collecting section 76 is effectively avoided. The prevention of heat transfer using this approach will enable the reaction chamber 50 to function with a maximum degree of effectiveness.

With continued reference to FIG. 1, the heating section 66 is sized to receive the $^{99}MoO_3$ crystals 34 therein which are subsequently processed (e.g. sublimated) as discussed below. Receipt (e.g. placement) of the $^{99}MoO_3$ crystals 34 within the reaction chamber 50 may be accomplished using two different approaches. First, a cavity may be directly formed within the side wall 56 inside the reaction chamber 50, the outline of which is illustrated in dashed lines at reference number 90 in FIG. 1. However, in a preferred embodiment, an open containment vessel 92 shown cross-sectionally in FIG. 1 is positioned within the heating section 66 of the reaction chamber 50. The containment vessel 92 (also known as a "boat") is placed directly on the inner surface 60 of the side wall 56 at position 94 as illustrated. The containment vessel 92 includes a closed bottom portion 96, upwardly-extending side portions 100, 102, and an open top portion 104. These components define an interior region 106 within the containment vessel 92 which is sized to receive the $^{99}MoO_3$ crystals 34 therein. During implementation of the claimed method, the $^{99}MoO_3$ crystals 34 will be processed inside the containment vessel 92 in accordance with the specific sublimation procedures described below. In a representative, non-limiting embodiment, the interior region 106 of the containment vessel 92 will have a depth "$Y_1$" (FIG. 1) of about 1–50 mm, again depending on whether a small-scale laboratory system 10 or a large scale commercial system 10 is involved. In the system 10 shown in FIG. 1, the interior region 106 of the containment vessel 92 will have a length of about 1–100 cm and a width of about 1–10 cm so that the interior region 106 has a total internal volume of about 0.1–5000 $cm^3$. However, these values may be varied within the foregoing ranges as necessary in accordance with numerous factors including the desired size and capacity of the processing system 10. Finally, optimum results will be achieved if the containment vessel 92 is manufactured from a composition which facilitates even and complete heating of the $^{99}MoO_3$ crystals 34 within the reaction chamber 50. The selected composition should also be sufficiently strong to accommodate the particular temperature changes experienced by the $^{99}MoO_3$ crystals 34 in the system 10 during operation. These benefits are achieved through the use of a containment vessel 92 made of platinum or a platinum alloy (e.g. Pt–Rh [90:10]). Other construction materials which may be employed for this purpose include an alloy of Ni—Cr, stainless steel, or quartz. The vessel 92 may be coated with an optional surface layer of platinum or gold at an average thickness of about 0.025–2.5 mm in order to prevent corrosion. However, to a achieve a maximum degree of stability and effectiveness, the containment vessel 92 will be manufactured from platinum or a platinum alloy, or will be coated with platinum as noted above, with the phrase "comprised of platinum" encompassing all of these variations.

It should also be noted at this point that formation of the $^{99}MoO_3$ crystals 34 using the steps discussed above may take place outside of the reaction chamber 50 in separate reaction vessels or may, in fact, be undertaken directly within the vessel 92 in the chamber 50. Whether the crystals 34 are initially produced inside or outside of the reaction chamber 50, the same results will be achieved, with both of these alternatives being considered equivalent in the present case. An additional aspect of the system 10 involves the use of an oxygen-containing oxidizing gas which is introduced into reaction chamber 50. While the function of the oxidizing gas will be described in further detail below, it is basically used to (1) move the desired gaseous (vaporized) reaction products through the system 10 for processing; and (2) convert various vaporized $^{99m}Tc$ compositions (e.g. $^{99m}TcO_3$ and $^{99m}TcO_2$) into $^{99m}Tc_2O_7$. Many different procedures and structural components may be used to deliver the gas into and through the reaction chamber 50. Accordingly, the present invention shall not be limited to any particular gas delivery methods or structures. However, a preferred gas delivery sub-system is schematically illustrated in FIG. 1.

With reference to FIG. 1, a supply of an oxygen-containing oxidizing gas 120 is provided which is retained within a storage container 122 of conventional design (e.g. made of steel or the like). As indicated below, representative oxygen-containing oxidizing gases 120 suitable for the purposes set forth herein will include $O_{2(g)}$, air, $O_{3(g)}$, $H_2O_{2(g)}$ or $NO_{2(g)}$, with $O_{2(g)}$ being preferred because of its effectiveness and ease of use. The storage container 122 is operatively connected to a tubular gas flow conduit 124 having a first end 126 and a second end 130. The first end 126 is attached to the storage container 122, with the second end 130 being connected to a cylindrical gas delivery unit 132 which surrounds both the heating section 66 and at least a portion of the intermediate section 74 of the reaction chamber 50. Positioned in-line within the gas flow conduit 124 is a conventional pump 134 (e.g. of a standard diaphragm type or other variety known and used for gas delivery). Alterna-tively, the pump 134 may be eliminated provided that the gas 120 is retained within the storage container 122 at a pressure level sufficient to ensure rapid and effective delivery of the gas 120 through the gas flow conduit 124 (e.g. about 1–3000 psi depending on the scale of the system 10). The gas flow conduit 124 may also have an optional in-line heater 135 therein which can be used to selectively heat the gas 120 during delivery if needed in accordance with preliminary pilot studies on the particular materials and system components being employed. The heater 135 may consist of any conventional (e.g. resistance-type) heater unit known in the art for the purposes set forth above. In-line heating using the heater 135 is designed to pre-heat the gas 120 to a temperature of about 20°–775° C. as it enters the gas delivery unit 132 so that optimum temperature levels may be maintained within the reaction chamber 50 while avoiding "cold spots".

As illustrated cross-sectionally in FIG. 1, the gas delivery unit 132 (which is configured in the form of an enclosed cylindrical jacket) entirely encompasses the first end 52 of the reaction chamber 50, as well as the heating section 66 and all or part (at least 50–75%) of the intermediate section 74. In a preferred embodiment, the gas delivery unit 132 and its various components will be constructed from an inert, heat-resistant material (e.g. silica glass, quartz, or a selected metal such as stainless steel). The gas delivery unit 132 includes a continuous tubular side wall 140 which is preferably circular (annular) in cross-section with an inner surface 142 and an outer surface 144. With reference to FIG. 1, the side wall 140 is sufficiently large to completely surround the heating section 66 and most of the intermediate section 74 of the reaction chamber 50. This size relationship enables the inner surface 142 of the side wall 140 to be spaced outwardly from the outer surface 62 of the reaction chamber 50 to create an annular gas flow zone 146 around the heating section 66 and intermediate section 74 as illustrated. In addition, the side wall 140 associated with the gas delivery unit 132 further includes a closed first end 150 and a closed second end 152. The first end 150 of the side wall 140 has an end plate 154 secured thereto (e.g. by welding or other conventional fastening method) in order to effectively seal the first end 150. In a preferred embodiment, the end plate 154 is manufactured from the same materials which are used to produce the other parts of the gas delivery unit 132 as discussed above. With continued reference to FIG. 1, the end plate 154 is spaced outwardly from the first end 52 of the reaction chamber 50 in order to form an open region 156 therebetween which functions as part of the gas flow zone 146 described above.

The second end 152 of the side wall 140 includes an end plate 160 secured thereto. The end plate 160 is designed to effectively seal the second end 152 of the side wall 140 and is secured thereto by welding or other conventional fastening method. The end plate 160 is preferably manufactured from the same materials listed above in connection with the other components of the gas delivery unit 132. The end plate 160 further includes an opening 162 therein which is sized to allow the annular side wall 56 of the reaction chamber 50 to pass therethrough. To effectively secure the end plate 160 in position as illustrated in FIG. 1, the outer surface 62 of the reaction chamber 50 is sealed to and within the opening 162 of the end plate 160 by conventional sealing methods (e.g. o-rings, gaskets, and/or a screw-type thread system of standard design associated with the reaction chamber 50 and the opening 162).

Finally, with continued reference to FIG. 1, the second end 152 of the side wall 140 used in connection with the cylindrical gas delivery unit 132 further includes a bore 164 therethrough. The bore 164 is sized to receive the second end 130 of the gas flow conduit 124. As previously noted, the gas flow conduit 124 is operatively connected to the storage container 122 having the oxidizing gas 120 therein. The second end 130 of the conduit 124 is retained within the bore 164 by conventional attachment methods including adhesives, frictional engagement, and/or conventional mechanical fasteners. In this manner, gas 120 from the storage container 122 can be delivered at a rapid rate to the system 10. Likewise, as discussed further below, the specific design of the gas delivery unit 132 will enable the gas 120 to be supplied in a counter-current flow orientation. Many benefits may be achieved using this approach, including the controlled cooling of materials within the intermediate section 74 in a highly efficient manner. As a result, a precise negative temperature gradient will be maintained within the intermediate section 74 so that the claimed purification process can occur with a maximum degree of efficiency.

While the gas delivery process and sub-system illustrated in FIG. 1 are preferred, an alternative embodiment (not shown) would involve direct attachment of the second end 130 of the gas flow conduit 124 to the first end 52 of the reaction chamber 50 using connection hardware known in the art for this purpose. The oxidizing gas 120 would then be delivered directly to the reaction chamber 50 without using the cylindrical gas delivery unit 132 described above. This embodiment would reduce the required amount of equipment in the system 10 and may be appropriate in various circumstances as determined by many factors including the type of system 10 under consideration, the desired scale of operation, and other related issues. Accordingly, the present invention shall not be restricted to any particular gas delivery method.

Even though the heating and cooling characteristics of the reaction chamber 50 are important aspects of the claimed process, the present invention shall not be restricted to any particular methods, components, or sub-systems which are used to provide the necessary degree of temperature control. The claimed method may involve many different procedures and sub-systems for achieving the desired temperature conditions within the heating section 66, intermediate section 74, and collecting section 76. Again, routine preliminary investigations may be employed to determine the heating and cooling systems which will provide optimum results in a given situation. However, FIG. 1 schematically illustrates various components which can be used to produce the desired thermal effects in the reaction chamber 50.

With reference to FIG. 1, the heating section 66 includes heating means 180 associated therewith. In a preferred embodiment, the heating means 180 will consist of a heater unit 182 positioned around the heating section 66 as illustrated. In the system 10 of FIG. 1, the heater unit 182 surrounds the outer surface 144 of the side wall 140 associated with the gas delivery unit 132. This particular arrangement of components not only heats the $^{99}MoO_3$ crystals 34 within the heating section 66, but also maintains the incoming oxidizing gas 120 in the gas delivery unit 132 at stable and desired temperature levels of about 20°–775° C. (in cooperation with the heater 135 if necessary). In the alternative embodiment described above which does not use the gas delivery unit 132 and related components, the heater unit 182 would surround the outer surface 62 of reaction chamber 50 at the heating section 66. In either embodiment, the heater unit 182 (which is schematically illustrated in FIG. 1) may involve many different systems which are known in the art for the general purposes set forth above. The heater unit 182 may consist of a single heating apparatus or a plurality of individual heating sub-systems with separate control units to achieve selective temperature adjustment at various positions on the heating section 66. Accordingly, the claimed invention shall not be limited to any particular type of heating system, provided that temperature levels of about 600°–775° C. (discussed further below) are maintained within the heating section 66 so that the $^{99}MoO_3$ crystals 34 can be sublimated as discussed below. In an exemplary and preferred embodiment, the heater unit 182 will specifically consist of a conventional tube furnace assembly or selected heating elements (e.g. nichrome wires) wrapped around the outer surface 144 of the gas delivery unit 132 or around the outer surface 62 of the reaction chamber 50 if a gas delivery unit 132 is not employed.

In the intermediate section 74 and the collecting section 76, progressive decreases in temperature spontaneously result from convective and radiant heat losses as the distance from the heating section 66 (and heating means 180) increases. In the embodiment of FIG. 1, gradual temperature decreases within the intermediate section 74 are facilitated by the counter-current movement of oxidizing gas 120 through the gas delivery unit 132 along the outer surface 62 of the reaction chamber 50. This situation will take place even if the gas 120 is preheated using the heater 135 since, during movement of the gas 120 through the system 10, it will carry heat away from the intermediate section 74 as it travels toward the first end 52 of the chamber 50. Also, in many cases, the temperature of the gas 120 will be much less than the temperature levels within the intermediate section 74, depending on the level of heating provided by the heater 135 (which may be used to heat the incoming gas 120 to a temperature within a broad range as noted above.) Further information on the desired temperature characteristics in the intermediate section 74 will be discussed below.

Regarding the collecting section 76, cooling is preferably provided by direct contact of the collecting section 76 with ambient air. As a result, the collecting section 76 in the embodiment of FIG. 1 is uncovered and exposed so that the outer surface 62 of the reaction chamber 50 at the collecting section 76 can come in contact with air at "room temperature" levels (e.g. about 20°–25° C.). This design will enable the necessary temperature decreases to occur in the section 76, with additional information on the operational characteristics of the section 76 being provided below.

Finally, either or both of the sections 74, 76 may be connected to external auxiliary cooling systems of conventional design (e.g. water jackets, chiller coils, and the like). These systems (not shown) would preferably surround the intermediate section 74, the collecting section 76, and/or the bevelled section 77 where section 74 meets section 76. While auxiliary cooling units are not a requirement in system 10, they may be needed to achieve a desired level of efficiency as determined by preliminary experimentation involving many factors including the size of the selected reaction chamber 50, the materials being processed, the ambient environmental conditions (temperatures) experienced by the system 10, and other factors. Accordingly, the present invention shall not be limited to any particular heating/cooling systems, provided that the necessary temperature gradients are achieved in the system 10 as discussed below.

C. A Preferred Method for Separating and Isolating $^{99m}Tc$ Reaction Products from Crystalline $^{99}MoO_3$ A preferred method for separating and isolating $^{99m}Tc$ reaction products from the $^{99}MoO_3$ crystals 34 will now be discussed with reference to the system 10 shown in FIG. 1. As previously noted, the claimed method shall not be restricted to the specific reaction chamber 50 of FIG. 1. Alternative reactor systems may be employed as long as they allow the necessary temperature conditions to be achieved.

In accordance with the embodiment of FIG. 1, the initial supply of $^{99}MoO_3$ crystals 34 (manufactured as described above) is placed within the containment vessel 92 in the heating section 66 of the reaction chamber 50. Alternatively, if an internal cavity is formed within the side wall 56 of the reaction chamber 50 as indicated by dashed lines 90 in FIG. 1, the $^{99}MoO_3$ crystals 34 are placed within the cavity.

Next, the $^{99}MoO_3$ crystals 34 are heated in the heating section 66 of the reaction chamber 50 to a first temperature which is sufficient to sublimate the crystals 34 but sufficiently low to (1) avoid melting the crystals 34; and (2) avoid forming vaporized $^{99}MoO_3$. To achieve sublimation of the crystals 34 and the above-listed goals in a representative embodiment, the crystals 34 will be heated to a first temperature of about 600°–775° C. (optimum=about 650°–700° C.) using the heating means 180. This temperature range is below the normal melting temperature (e.g. 795° C.) of $^{99}MoO_3$ and is designed to produce a controlled sublimation reaction which avoids the production of undesired side products (e.g. vaporized $^{99}MoO_3$) which are typically generated in processes which use higher temperature levels and non-crystalline $^{99}MoO_3$. As a result, a $^{99m}Tc$ product with high purity levels is generated without any need to conduct separate purification steps to remove waste $^{99}MoO_3$ products from the gaseous materials in the system 10. Incidentally, it should be noted that the first temperature may be any temperature which is less than the melting point of the $^{99}MoO_3$ crystals 34 but is nonetheless high enough to sublimate the crystals 34.

Heating of the $^{99}MoO_3$ crystals 34 in the foregoing manner at the above-listed temperature level initiates a sublimation process which causes a gaseous mixture 190 (FIG. 1) to evolve directly from the crystals 34 during the heating process. The gaseous mixture 190 will include the following components in combination: (1) vaporized $^{99m}TcO_3$; and (2) vaporized $^{99m}TcO_2$. A small amount of vaporized $^{99m}Tc_2O_7$ may also be produced. However, it is believed that the amount of any vaporized $^{99m}Tc_2O_7$ in the gaseous mixture 190 will be so small that, for the sake of clarity and convenience, the gaseous mixture 190 at this stage will be designated to only include vaporized $^{99m}TcO_3$ and vaporized $^{99m}TcO_2$. However, of primary importance is the lack of vaporized $^{99}MoO_3$ in the mixture 190. In this regard, the gaseous mixture 190 will be approximately +99% free from vaporized $^{99}MoO_3$ which, for the purposes of this invention, justifies characterization of the gaseous mixture 190 as lacking any contaminating amounts of vaporized $^{99}MoO_3$ therein.

The unique structure associated with the $^{99}MoO_3$ crystals 34 provides many benefits, including a lack of vaporized $^{99}MoO_3$ in the gaseous mixture 190 as noted above. Specifically, the thin, needle-like character of the crystals 34 creates a substantial amount of exposed surface area which facilitates the evolution of $^{99m}Tc$ compounds therefrom in a highly efficient manner during sublimation. Likewise, the thin and elongate character of the crystals 34 provides a shortened diffusion path for release of the volatile $^{99m}Tc$ compounds compared with the use of non-crystalline $^{99}MoO_3$ granular materials. The presence of a shortened diffusion path in the crystals 34, as well as the increased level of surface area, enable the desired $^{99m}Tc$ compositions (e.g. vaporized $^{99m}TcO_3$ and vaporized $^{99m}TcO_2$) to evolve in a more rapid and complete manner at lower (sub-melting) temperatures. Lower operating temperatures provide an equally important benefit, namely, the ability to generate the desired final $^{99m}Tc$ compositions while avoiding the production of undesired vaporized $^{99}MoO_3$ which typically results when higher temperatures are employed. As noted above, the presence of vaporized $^{99}MoO_3$ will contaminate the final $^{99m}Tc$ product unless the $^{99}MoO_3$ is removed from the processing system using additional steps and procedures (e.g. additional condensation stages). These supplemental stages can increase the cost and complexity of the production system. Finally, in accordance with a current understanding of the chemical and physical processes associated with the $^{99}MoO_3$ crystals 34, it appears that the desired $^{99m}Tc$ radioactive species within the crystals 34 are effectively partitioned (e.g. segregated or precipitated on the surfaces of the crystals 34) from other non-$^{99m}Tc$ components. Segregation in this manner facilitates the rapid and complete evolution of desired final $^{99m}Tc$ compounds during sublimation without the co-production of vaporized $^{99}MoO_3$ contaminants. In this regard, the production and subsequent low-temperature sublimation of crystalline $^{99}MoO_3$ constitute unique features of the present invention which provide numerous benefits.

Heating of the $^{99}MoO_3$ crystals 34 will occur in a thorough and consistent manner within the containment vessel 92 as previously discussed. In particular, the selection of a containment vessel 92 manufactured from the materials listed above (particularly platinum) will ensure that the $^{99}MoO_3$ crystals 34 are evenly heated. The use of a containment vessel 92 made from the foregoing materials (particularly platinum) also prevents the vessel 92 from changing shape at the temperature levels encountered within the heating section 66. As a result, the bottom portion 96 of the vessel 92 will remain substantially flat so that even heating is ensured. A containment vessel 92 made of these materials will likewise avoid breakage problems when the $^{99}MoO_3$ crystals 34 in the vessel 92 undergo substantial temperature changes during deactivation of the system 10.

The heating process described above is typically allowed to continue for a time period of about 0.1–2 hours, although the exact heating time will depend on the type of heating means 180 being employed and the amount of $^{99}MoO_3$ crystals 34 within the system 10. Immediately before or during initiation of the heating process, the oxidizing gas 120 (e.g. $O_{2(g)}$) is introduced into the reaction chamber 50 for combination with the gaseous mixture 190 in the heating section 66. The oxidizing gas 120 is designed to convert the vaporized $^{99m}TcO_3$ and vaporized $^{99m}TcO_2$ to a supply of vaporized $^{99m}Tc_2O_7$ as discussed further below. In the embodiment of FIG. 1, the supply of oxidizing gas 120 is delivered from the storage container 122 through the gas flow conduit 124 using the pump 134. If the gas 120 is sufficiently pressurized as noted above, release of the gas 120 from the container 122 will cause it to spontaneously pass through the gas flow conduit 124 in a similar manner without using the pump 134. The gas 120 will then flow from the conduit 124 into the cylindrical gas delivery unit 132. Specifically, the gas 120 will enter the gas delivery unit 132 through the bore 164 (FIG. 1) and thereafter pass into the annular gas flow zone 146 surrounded by the side wall 140. As the gas 120 continues to enter the gas delivery unit 132, it will flow in the direction of arrows 192 and simultaneously pass over the outer surface 62 of the reaction chamber 50 at the intermediate section 74 in order to provide a temperature modulating effect (discussed further below).

The gas 120 will then pass through the open region 156 between the end plate 154 and the first end 52 of the reaction chamber 50, followed by entry into the first end 52 in the direction of arrow 194. In a preferred embodiment designed to facilitate the separatory process, the gas 120 will flow into and through the reaction chamber 50 at a flow rate of about 10–100 std. cc/min which may be achieved by proper adjustment of the gas pump 134 or other conventional gas flow regulators (not shown). Likewise, this flow rate will be applicable in alternative variations of the system 10 which do not use the gas delivery unit 132 and instead directly introduce the gas 120 into the open first end 52 of the reaction chamber 50 as discussed above. However, the actual gas flow rate in a given situation will depend on a variety of factors including the size of the system 10, the materials being processed, and other considerations. As noted above, delivery of the gas 120 may be undertaken immediately before or simultaneously with sublimation of the $^{99}MoO_3$ crystals 34. In addition, the gas 120 is optimally delivered into the reaction chamber 50 at a temperature of about 20°–775° C. which is achieved prior to passage over the $^{99}MoO_3$ crystals 34 using the heating means 180 which surrounds the gas delivery unit 132 in cooperation with the heater 135 if necessary.

As the gas 120 (e.g. $O_{2(g)}$) passes into and through the heating section 66, it combines with the gaseous mixture 190 to form a gaseous stream 196 schematically illustrated in FIG. 1. During this process, the gas 120 oxidizes the vaporized $^{99m}TcO_3$ and vaporized $^{99m}TcO_2$ in the gaseous mixture 190 to form a supply of vaporized $^{99m}Tc_2O_7$ therefrom as previously noted. As a result, the gaseous stream 196 at this stage will consist of the following materials in combination: (1) remaining (unreacted) amounts of the gas 120 (e.g. $O^{2(g)}$); and (2) vaporized $^{99m}Tc_2O_7$. In a preferred embodiment, excess amounts of the gas 120 will be used in the system 10 above the amount necessary to perform an oxidizing function so that the gas 120 can also be used as a continuous carrier to move the various vaporized materials through the system 10. For this reason, excess amounts of unreacted gas 120 will, in most cases, be present in the gaseous stream 196. The gaseous stream 196 then passes out of the heating section 66 at approximately the same flow rate associated with the initial entry of the oxidizing gas 120 into the reaction chamber 50, and thereafter enters the intermediate section 74. As previously noted, the intermediate section 74 begins at position 70 and ends at position 72 illustrated in FIG. 1. The intermediate section 74 (which may be of variable length as indicated above) is designed for use as a gas transfer zone in which a certain degree of preliminary transitional cooling takes place prior to main cooling (condensation) in the collecting section 76.

As the gaseous stream 196 enters the intermediate section 74 in the specific embodiment of FIG. 1, it is subjected to a gradual, transitional cooling process which will correspondingly reduce the degree of cooling (e.g. the amount of temperature drop) which is ultimately needed for condensation in the collecting section 76. This is accomplished by the formation of a specific negative temperature gradient along the length of the intermediate section 74, with the gaseous stream 196 experiencing a gradual decrease in temperature while it moves through the section 74. When the gaseous stream 196 enters the intermediate section 74, it will have an initial temperature of about 600°–775° C. in a representative embodiment as it passes position 70 shown in FIG. 1. A gradual and progressive decrease in the temperature of the gaseous stream 196 will then take place in the intermediate section 74. Specifically, the gaseous stream 196 in the intermediate section 74 is cooled from the initial temperature of about 600°–775° C. at position 70 to a transitional temperature of about 300°–400° C. when the stream 196 exits the intermediate section 74 at position 72. Likewise, optimum results will be achieved if the temperature decrease associated with the gaseous stream 196 is undertaken at a cooling rate of about 5°–50° C./cm within the intermediate section 74. The term "cooling rate" as used herein shall involve the amount of cooling (in °C.) per unit length of the section under consideration. This is accomplished by the control of numerous factors including the length $L_2$ of the intermediate section 74 which (as noted above) is optimally about 1–100 cm, depending on the desired scale of the system 10. Also, the cooling rate in the intermediate section 74 may be controlled by the countercurrent flow of gas 120 through the gas delivery unit 132 along the outer surface 62 of the reaction chamber 50.

However, because the intermediate section 74 is not being used to perform a direct separation of any particular components in the gaseous materials travelling through the system 10, the length "$L_2$" and diameter "$D_2$" of the intermediate section 74 are not critical. In this regard, the length "$L_2$" and diameter "$D_2$" of the intermediate section 74 will be selected in accordance with many considerations including the size of the system 10 and amount of transitional cooling which is desired prior to the final $^{99m}Tc$ condensation stages. A greater degree of transitional cooling which occurs within the intermediate section 74 will enable a smaller (e.g. shorter) final collecting section 76 to be used as discussed above. For this reason, the length "$L_2$" and diameter "$D_2$" of the intermediate section 74 may be varied as needed in accordance with the desired structural configuration of the system 10 which depends on numerous economic and operational factors.

It is also possible for the intermediate section 74 to be eliminated entirely, provided that the final cooling/condensation stages of the system 10 (e.g. the collecting section 76) are reconfigured to enable rapid and complete cooling of the gaseous materials in the system 10 to condensation levels. Reconfiguration of the final stages of the system 10 may involve increases in the size (length and/or diameter) of the collecting section 76 or the addition of chiller coils and other auxiliary cooling systems at the second end 54 of the reaction chamber 50. In this regard, the present invention shall be not limited to any particular sizes, dimensions, and configurations in connection with the various sections of the reaction chamber 50, provided that the necessary sublimation and condensation processes are able to occur with a maximum degree of effectiveness.

While the adjustment of various operating parameters within the system 10 may be undertaken to achieve optimum results in connection with the intermediate section 74 (which is not critical from an functional standpoint), a representative intermediate section 74 will include the following operational characteristics: (1) initial temperature of the gaseous stream 196 at position 70=650° C.; (2) temperature of the gaseous stream 196 at position 72=350° C.; (3) flow rate of the gaseous stream 196 through the intermediate section 74=35 std. cc/min; (4) cooling rate =10° C./cm.; (5) length $L_2$ of the intermediate section 74=25 cm; (6) diameter $D_2$ of the passageway 64 through the intermediate section 74=20 mm; (7) flow rate of the gas 120 as it passes along the outer surface 62 of the reaction chamber 50 at the intermediate section 74=35 std. cc/min; and (8) temperature of the gas 120 as it enters the gas delivery unit 132=20° C. However, the present invention shall not be limited to these values which are provided for example purposes.

As the gaseous stream 196 leaves the intermediate section 74 at position 72 (FIG. 1), it will remain unchanged from a chemical standpoint, and will again contain the following compositions in combination: (1) remaining (unreacted) amounts of the oxidizing gas 120 (e.g. $O_{2(g)}$); and (2) vaporized $^{99m}Tc_2O_7$. Next, the gaseous stream 196 enters the reaction product collecting section 76 of the reaction chamber 50 as it passes position 72 (FIG. 1). The collecting section 76 functions as the main cooling/condensation stage in the system 10. The gaseous stream 196 is then condensed within the collecting section 76 to remove the vaporized $^{99m}Tc_2O_7$ from the stream 196. It should be noted that the term "condensation" as used herein actually involves a process known as "desublimation" since the vaporized $^{99m}Tc_2O_7$ is directly converted from a gaseous form to a solid product (discussed below). Both of these terms shall therefore be deemed interchangeable and equivalent for the purposes of this invention.

As the gaseous stream 196 enters the collecting section 76, it will have a starting temperature of about 300°–400° C. in the specific embodiment of FIG. 1 (which is substantially the same as the transitional temperature of the gaseous stream 196 when it left the intermediate section 74). However, as previously noted, the starting temperature of the gaseous stream 196 as it enters the collecting section 76 will vary depending on the size characteristics of the other parts of the system 10 (e.g. the intermediate section 74) which may be adjusted as desired. The gaseous stream 196 is then cooled to a final or ending temperature of about 20°–80° C as it passes through and leaves the collecting section 76 at the second end 54 of the reaction chamber 50. This temperature decrease will occur in a gradual and progressive manner in order to ensure maximum yields of the desired $^{99m}Tc$ final product. Optimum results will be achieved if the temperature decrease associated with the gaseous stream 196 in the collecting section 76 is undertaken at a cooling rate of about 4°–200° C./cm therein depending on the size and desired scale of the system 10 as again determined by preliminary investigation. It should also be noted that the flow rate associated with the gaseous stream 196 at this stage will remain constant at the values listed above. In this regard, the flow rate of the gaseous stream 196 through all parts of the reaction chamber 50 will, in a preferred embodiment, be the same (e.g. at about 10–100 std. cc/min as previously noted).

Cooling of the gaseous stream 196 within the reaction product collecting section 76 is primarily accomplished by controlling the length $L_3$ of the collecting section 76 as discussed above. In a preferred embodiment, the collecting section 76 is cooled by direct contact with ambient air (which will have a temperature of about 20 °–25° C. in typical processing environments.) The use of a sufficiently long collecting section 76 will avoid the need for external cooling systems at this stage of the reaction process (e.g. water cooling units, chiller coils, etc.) However, conventional auxiliary cooling systems may be used if appropriate as determined by preliminary pilot studies involving many factors including the size of the system 10 being employed, as well as the environmental conditions associated with the process. Thus, any method by which the temperature of the gaseous stream 196 is reduced to a final value within the range set forth above may be employed within the scope of the invention. In summary, the condensation and removal of vaporized $^{99m}Tc_2O_7$ from the gaseous stream 196 is accomplished within the collecting section 76 by control of the following factors: (1) decreasing the temperature of the gaseous stream 196 from the starting value listed above to the designated ending value; (2) the use of a collecting section 76 having a length $L_3$within the above-described range; and (3) cooling of the gaseous stream 196 at the foregoing rate. All of these factors enable vaporized $^{99m}Tc_2O_7$ in the gaseous stream 196 to be condensed in a highly effective manner. As a result, a solid, adherent $^{99m}Tc_2O_7$ film 202 (FIG. 1) will collect on the inner surface 60 of the reaction chamber 50 in the collecting section 76. While formation of the $^{99m}Tc_2O_7$ film 202 will typically occur by condensation, other processes may also be taking place within the collecting section 76 in connection with the formation of film 202. For example, one of these other processes may involve adsorption on the inner surfaces of the collecting section 76. In this regard, the exact processes which take place within the collecting section 76 are not completely known at the present time. However, since it is currently understood that condensation is the primary physical process which occurs within the collecting section 76, the term "condensation" shall be used herein to collectively encompass all of the solidification and isolation processes associated with the $^{99m}Tc_2O_7$ film 202.

In accordance with the foregoing procedure, the efficient removal of vaporized $^{99m}Tc_2O_7$ from the gaseous stream 196 is accomplished. The claimed procedure can remove about 90–100% of the vaporized $^{99m}Tc_2O_7$ from the gaseous stream 196 as it passes through the collecting section 76. While the adjustment of various operating parameters within the system 10 may be needed to achieve optimum results, a representative collecting section 76 will include the following operational characteristics: (1) starting temperature of the gaseous stream 196 at position 72 upon entry into the collecting section 76=350° C.; (2) ending temperature of the gaseous stream 196 at the end of the collecting section 76 (e.g. at the second end 54 of the reaction chamber 50)=20° C.; (3) flow rate of the gaseous stream 196 through the collecting section 76=35 std. cc/min; (4) cooling rate =15° C./cm.; (5) length $L_3$ of the collecting section 76=20 cm; (6) diameter $D_3$ of the passageway 64 through the collecting section 76=5 mm; and (7) temperature of the ambient air outside the collecting section 76=20° C. However, the present invention shall not be limited to these values which are provided for example purposes.

The $^{99m}Tc_2O_7$ film 202 is then collected (removed) from the collecting section 76 using a selected eluant solution as discussed below. To minimize the amount of eluant which is required for this purpose, the diameter $D_3$ of the passageway 64 through the collecting section 76 is maintained at a minimal level, with preferred $D_3$ values being listed above (e.g. about 0.1–5 cm depending on the desired size and scale of the system 10). Larger $D_3$ values will typically result in a collecting section 76 with a shorter overall length $L_3$. However, more eluant would then be needed to remove the $^{99m}Tc_2O_7$ film 202 from the system 10 which is undesirable from an economic and technical standpoint.

At this stage, the reaction process is substantially completed. The gaseous stream 196 leaving the open second end 54 of the reaction chamber 50 in the embodiment of FIG. 1 where the oxidizing gas 120 is used as a carrier will consist of substantially pure (+95%) residual (unreacted) oxidizing gas 120 (e.g. $O_{2(g)}$) with the balance of the stream 196 comprising various impurities and very small (inconsequential) levels of residual $^{99m}Tc$ compounds. The final (remaining) oxygen-containing oxidizing gas 120 leaving the reaction chamber 50 at the second end 54 (designated at reference number 204 in FIG. 1) is then discarded or filtered in a conventional manner and reused as desired (especially if $O_{2(g)}$ is involved) by transferring the gas 204 back into the storage container 122 via conduit 206. The $^{99m}Tc_2O_7$ film 202 which remains within the collecting section 76 represents and shall be characterized as a condensed $^{99m}$Tc-containing reaction product 208 which is the desired $^{99m}$Tc composition in this case. The $^{99m}$Tc-containing reaction product 208 is thereafter removed and further processed as desired, depending on the intended uses of the product 208 and other factors. The claimed method shall not be limited to any collection and treatment methods concerning the $^{99m}$Tc-containing reaction product 208. It should also be noted that the entire process described above typically takes only about 0.1–2 hours from start to finish, depending on the scale of the system 10.

However, at this point, an additional discussion is warranted regarding the specific character of the $^{99m}$Tc-containing reaction product 208. As previously discussed, the "m" in the $^{99m}$Tc-containing reaction product 208 signifies the metastable excited state of the technetium isotope whose atomic weight is 99. This metastable state has the aforementioned half-life of six hours, and is a medically useful radioisotope of technetium. This is distinct from the ground state of the same isotope, $^{99}$Tc, which is also radioactive but whose half-life is about 213,000 years. The metastable state decays into the ground state, so $^{99}$Tc is always present to some degree in $^{99m}$Tc compositions, and increases with time. The two isomeric states of the same nucleus are impossible to distinguish chemically, and the $^{99}$Tc effectively competes with the $^{99m}$Tc in all known radiolabelling reactions. Thus, as a practical matter, suppliers of $^{99m}$Tc compositions always need to address how they will keep the amount of $^{99}$Tc contamination within acceptable levels through prompt handling and distribution.

In accordance with the claimed process, the next step involves collecting (removing) the $^{99m}$Tc-containing reaction product 208 (e.g. the $^{99m}Tc_2O_7$ film 202) from the collecting section 76 of the reaction chamber 50. As noted above, many different methods may be used to accomplish this goal, with the present invention not being limited to a single collection technique. In a preferred embodiment, the flow of gas 120 into the reaction chamber 50 is discontinued, followed by the introduction of a selected eluant 210 into the passageway 64 at the second end 54 of the chamber 50 (e.g. at the collecting section 76). A representative eluant 210 will consist of isotonic saline solution (e.g. 0.9% by weight NaCl). While isotonic saline solution is preferred, other eluants which may be employed include HCl (followed by neutralization with NaOH) at about the same concentration levels. The amount of eluant 210 to be used will depend on the quantity of $^{99m}Tc_2O_7$ film 202 (e.g. $^{99m}$Tc-containing reaction product 208) which is present in the collecting section 76. However, an amount should be used which is sufficient to dissolve all of the $^{99m}$Tc-containing reaction product 208 that is present in the section 76. In a representative embodiment involving a reaction chamber 50 having the broad dimension ranges listed above, about 0.01–2000 ml of eluant 210 will typically be used per mg of $^{99m}$Tc-containing reaction product 208, although this amount may be adjusted as necessary in accordance with routine preliminary experimentation. If 0.9% by weight saline solution is employed as the eluant 210, the foregoing process will typically result in a product concentration of greater than about 500 mCi $^{99m}$Tc/ml of eluant 210.

The eluant 210 is typically maintained at room temperature (e.g. about 20°–25° C.), and is allowed to remain in contact with the $^{99m}$Tc-containing reaction product 208 for a "soak" time of about 0.1–10 minutes (especially when a quartz reaction chamber 50 is involved). Using this process, at least about 90% or more of the $^{99m}$Tc-containing reaction product 208 (e.g. $^{99m}Tc_2O_7$ film 202) can be recovered from the system 10. As a result, a final $^{99m}$Tc-containing solution 212 (containing the dissolved $^{99m}Tc_2O_7$ film 202 in the form of an ionic solution of pertechnetate [$^{99m}TcO_4^-$] ions) is obtained as schematically illustrated in FIG. 1. The final $^{99m}$Tc-containing solution 212 can be temporarily stored prior to use, immediately used, or further processed. Additional processing steps may include supplemental purification using an alumina column to remove any residual molybdate ions that are carried over into the eluate. However, the amount of these materials (molybdate ions) will be very small (if not negligible) in view of the highly-efficient reaction procedure described above, thereby avoiding any requirement that supplemental purification be undertaken.

The $^{99m}$Tc-containing reaction product 208 has a high purity level. In 5 ml of the final $^{99m}$Tc-containing solution 212, the total $^{99}$Mo/$^{100}$Mo concentration is normally about 4 μg/ml compared with a $^{99}$Mo/$^{100}$Mo concentration in fission-produced $^{99m}$Tc products of about 50 μg/ml. As a result, the final $^{99m}$Tc-containing solution 212 is sufficiently pure to be used for medical purposes without further treatment in accordance with currently-accepted standards, and will typically contain about 0.1–5 Ci of $^{99m}$Tc per ml. However, this value may vary depending on reaction conditions and the type of starting materials which are employed. If increased purity levels are desired in order to achieve an even further reduction in the amount of $^{99}$Mo/$^{100}$Mo contaminants, the final $^{99m}$Tc-containing solution 212 can be passed through an alumina ($Al_2O_3$) column of conventional design (not shown) as noted above. Since each gram of alumina typically has a capacity to retain at least about 1000 μg of $^{99}$Mo/$^{100}$Mo, a very small column can be used to accomplish purification. Treatment in this manner can reduce the residual amount of $^{99}$Mo/$^{100}$Mo in the $^{99m}$Tc-containing solution 212 by a factor of at least about 80,000. However, it is again emphasized that the final $^{99m}$Tc-containing solution 212 prior to any supplemental treatment as discussed above will be approximately 95–99% free from residual $^{99}$Mo contaminants.

As a result of the sublimation process described above, a residual $^{99}MoO_3$-containing reaction product 250 (FIG. 1) will typically remain within the heating section 66 of the reaction chamber 50 after the desired production cycle is completed. The claimed $^{99m}$Tc isolation process is typically done at discrete intervals or "milkings" to obtain specific on-demand quantities of the final $^{99m}$Tc-containing solution 212. On-demand processing is undertaken since the $^{99m}$Tc-containing solution 212 is subject to rapid decay and deterioration, with a $^{99m}$Tc half-life of about six hours. In this regard, the over-production of large amounts of the final $^{99m}$Tc product that are not needed for immediate use is undesired. For this reason, the residual $^{99}MoO_3$-containing reaction product 250 which remains after system deactivation in an on-demand system will normally contain significant amounts of $^{99m}$Tc compositions remaining therein. In accordance with a preferred embodiment of the invention, the residual $^{99}MoO_3$-containing reaction product 250 is regenerated (e.g. reprocessed) so that it can be used again when needed. Tests have shown that regeneration of the residual $^{99}MoO_3$-containing reaction product 250 as described below will provide maximum yields of the desired final $^{99m}$Tc compositions compared with a situation in which the reaction product 250 is not regenerated and simply re-sublimated in the reaction chamber 50 without removal from the system 10. It appears that regeneration of the residual $^{99}MoO_3$-containing reaction product 250 during successive "milkings" achieves maximum yields of the desired final $^{99m}Tc$ compositions because of the very effective segregation of the desired $^{99m}Tc$ compositions in the regenerated products which results from the regeneration process discussed below.

In a preferred embodiment, regeneration (e.g. reprocessing) is undertaken by first collecting the residual $^{99}MoO_3$-containing reaction product 250 from the heating section 66 of the reaction chamber 50 after deactivation of the system 10. This is accomplished by physically removing the reaction product 250 from the containment vessel 92 in the embodiment of FIG. 1. Next, the residual $^{99}MoO_3$-containing reaction product 250 is dissolved in at least one secondary solvent material 252 in order to produce a dissolved $^{99}MoO_3$ product 254. Representative compositions which may be employed as the secondary solvent material 252 include but are not limited to $NH_4OH$ or $H_2SO_4$. To produce the dissolved $_{99}MoO_3$ product 254, the reaction product 250 will optimally be combined with the selected secondary solvent material 252 in a reaction product 250 : secondary solvent material 252 weight ratio of about 1–5:1–25. However, this ratio represents an exemplary embodiment which may be varied in accordance with preliminary pilot studies on the particular materials being processed.

The dissolved $^{99}MoO_3$ product 254 is then dried (evaporated) to produce regenerated (e.g. reprocessed) $^{99}MoO_3$ crystals. Many different methods may be used to dry the dissolved $^{99}MoO_3$ product 254, and the present invention shall not be limited to any particular evaporation method for this purpose. For example, in the embodiment of FIG. 1, the dissolved $^{99}MoO_3$ product 254 is dried (evaporated) in a sealed oven apparatus 260 of conventional design at a temperature of about 250°–500° C. for about 5–60 minutes to produce a supply of regenerated $^{99}MoO_3$ crystals 262. The regenerated $^{99}MoO_3$ crystals 262 can then be reused as desired within the reaction chamber 50 to generate additional amounts of the $^{99m}Tc$-containing reaction product 208 on-demand in accordance with the procedures outlined above and shown in FIG. 1. As previously indicated, this particular procedure enables greater yields of the $^{99m}Tc$ final product compared with situations in which the residual $^{99}MoO_3$-containing reaction product 250 is simply allowed to remain within the reaction chamber 50 for further sublimation without reprocessing. Finally, it should be noted that while the reuse and reprocessing of the materials described above is preferred for optimum results, these procedures are not an absolute requirement in the system 10 and are undertaken as needed.

The present invention represents a substantial development in the production of $^{99m}Tc$ compositions. The claimed method is characterized by numerous benefits compared with prior manufacturing processes (including fission-based production systems). These benefits include but are not limited to: (1) the production of substantial yields of $^{99m}Tc$ in a low-temperature thermal isolation process without the corresponding production of undesired vaporized $^{99}MoO_3$ by-products; (2) the ability to produce substantial $^{99m}Tc$ yields without using reactor-based uranium processes; (3) the isolation of $^{99m}Tc$ compositions from $^{99}Mo$ products in a manner which avoids losses caused by incomplete separation of these materials; (4) generation of the desired $^{99m}Tc$ compositions using a procedure which is cost effective, rapid, safe, and avoids the production of hazardous, long-term nuclear wastes; (5) the development of a method which includes a controlled condensation system to provide a high product purity level with a minimal number of operational steps; (6) the use of a simplified production system that does not require supplemental vapor filtration components and other sub-systems for the removal of waste $^{99}MoO_3$ by-products; (7) the ability to manufacture desired $^{99m}Tc$ compositions using a minimal amount of equipment; (8) the production of $^{99m}Tc$ reaction products at higher efficiency rates and purity levels compared with conventional processes; and (9) the effective generation of $^{99m}Tc$ reaction products using low activity level starting materials. These benefits are achieved by the unique features described above, namely, the use of crystalline $^{99}MoO_3$ with a high degree of surface area in accordance with a unique process undertaken at pre-melting temperatures.

Having herein described preferred embodiments of the present invention, it is anticipated that suitable modifications may be made thereto by individuals skilled in the art which nonetheless remain within the scope of the invention. Depending on the type and desired capacity of the processing system, adjustments may be made to the specific operating parameters set forth above. The type of hardware to be used may also be varied as necessary. For example, the interior surfaces of the various sections of the reaction chamber 50 (especially the collecting section 76) may be coated with additional materials (e.g. polytetrafluoroethylene [Teflon®]) to enhance the condensation/adsorption processes therein. Likewise, additional heating or cooling systems may be employed in connection with the sections 74, 76 of the reaction chamber 50 as determined by routine experimental investigation to maintain the necessary temperature gradients and ensure maximum yields/purity levels. Other reaction chamber systems may also be used, provided that the basic process steps described above are employed. In this regard, the present invention shall only be construed in accordance with the following claims:

We claim:

1. A method for isolating and producing a $^{99m}Tc$-containing reaction product from a $^{99}Mo$ compound comprising:

providing an initial supply of $^{99}Mo$ metal;

dissolving said $^{99}Mo$ metal in at least one oxygen-containing primary solvent to generate a solvated $^{99}Mo$ product;

drying said solvated $^{99}Mo$ product to produce a plurality of $^{99}MoO_3$ crystals;

heating said $^{99}MoO_3$ crystals to a first temperature, said first temperature being sufficiently high to sublimate said $^{99}MoO_3$ crystals and generate a gaseous mixture therefrom comprising vaporized $^{99m}TcO_3$ and vaporized $^{99m}TcO_2$, with said first temperature being sufficiently low to avoid melting said $^{99}MoO_3$ crystals and sufficiently low to likewise avoid forming vaporized $^{99}MoO_3$ during said heating of said $^{99}MoO_3$ crystals;

converting said vaporized $^{99m}TcO_3$ and said vaporized $^{99m}TcO_2$ in said gaseous mixture to a supply of vaporized $^{99m}Tc_2O_7$;

cooling said vaporized $^{99m}Tc_2O_7$ to a final temperature sufficient to condense said vaporized $^{99m}Tc_2O_7$ so that a condensed $^{99m}Tc$-containing reaction product is produced therefrom; and collecting said condensed $^{99m}Tc$-containing reaction product.

2. The method of claim 1 wherein said primary solvent is selected from the group consisting of $HNO_3$, $H_2O_2$ and $H_2SO_4$.

3. The method of claim 1 wherein said first temperature is about 600°–775° C.

4. The method of claim 1 wherein said final temperature is about 20°–80° C.

5. The method of claim 1 wherein said converting of said vaporized $^{99m}TcO_3$ and said vaporized $^{99m}TcO_2$ in said gaseous mixture to said vaporized $^{99m}Tc_2O_7$ comprises passing a supply of an oxidizing gas over said $^{99}MoO_3$ crystals during said heating thereof, said passing of said oxidizing gas over said $^{99}MoO_3$ crystals producing a gaseous stream comprising said oxidizing gas in combination with said gaseous mixture, said oxidizing gas oxidizing said vaporized $^{99m}TcO_3$ and said vaporized $^{99m}TcO_2$ in said gaseous mixture to form said vaporized $^{99m}Tc_2O_7$ therefrom.

6. The method of claim 5 wherein said oxidizing gas is selected from the group consisting of $O_{2(g)}$, air, $O_{3(g)}$, $H_2O_{2(g)}$, and $NO_{2(g)}$.

7. A method for isolating and producing a $^{99m}Tc$-containing reaction product from a $^{99}Mo$ compound comprising:

providing an electron accelerator apparatus and a supply of $^{100}Mo$ metal;

activating said electron accelerator apparatus in order to generate high energy photons therein;

irradiating said $^{100}Mo$ metal with said high energy photons from said electron accelerator apparatus to produce $^{99}Mo$ metal therefrom;

dissolving said $^{99}Mo$ metal in at least one oxygen-containing primary solvent to generate a solvated $^{99}Mo$ product;

drying said solvated $^{99}Mo$ product to produce a plurality of $^{99}MoO_3$ crystals;

heating said $^{99}MoO_3$ crystals to a first temperature, said first temperature being sufficiently high to sublimate said $^{99}MoO_3$ crystals and generate a gaseous mixture therefrom comprising vaporized $^{99m}TcO_3$ and vaporized $^{99m}TcO_2$, with said first temperature being sufficiently low to avoid melting said $^{99}MoO_3$ crystals and sufficiently low to likewise avoid forming vaporized $^{99}MoO_3$ during said heating of said $^{99}MoO_3$ crystals;

converting said vaporized $^{99m}TcO_3$ and said vaporized $^{99m}TcO_2$ in said gaseous mixture to a supply of vaporized $^{99m}Tc_2O_7$;

cooling said vaporized $^{99m}Tc_2O_7$ to a final temperature sufficient to condense said vaporized $^{99m}Tc_2O_7$ so that a condensed $^{99m}Tc$-containing reaction product is produced therefrom; and collecting said condensed $^{99m}Tc$-containing reaction product.

8. The method of claim 7 wherein said primary solvent is selected from the group consisting of $HNO_3$, $H_2O_2$ and $H_2SO_4$.

9. The method of claim 7 wherein said first temperature is about 600°–775° C.

10. The method of claim 7 wherein said final temperature is about 20°–80° C.

11. The method of claim 7 wherein said converting of said vaporized $^{99m}TcO_3$ and said vaporized $^{99m}TcO_2$ in said gaseous mixture to said vaporized $^{99m}Tc_2O_7$ comprises passing a supply of an oxidizing gas over said $^{99}MoO_3$ crystals during said heating thereof, said passing of said oxidizing gas over said $^{99}MoO_3$ crystals producing a gaseous stream comprising said oxidizing gas in combination with said gaseous mixture, said oxidizing gas oxidizing said vaporized $^{99m}TcO_3$ and said vaporized $^{99m}TcO_2$ in said gaseous mixture to form said vaporized $^{99m}Tc_2O_7$ therefrom.

12. The method of claim 11 wherein said oxidizing gas is selected from the group consisting of $O_{2(g)}$, air, $O_{3(g)}$, $H_2O_{2(g)}$, and $NO_{2(g)}$.

13. A method for isolating and producing a $^{99m}Tc$-containing reaction product from a $^{99}Mo$ compound comprising:

providing an initial supply of $^{99}Mo$ metal;

dissolving said $^{99}Mo$ metal in at least one oxygen-containing primary solvent to generate a solvated $^{99}Mo$ product;

drying said solvated $^{99}Mo$ product to produce a plurality of $^{99}MoO_3$ crystals;

heating said $^{99}MoO_3$ crystals to a first temperature of about 600°–775° C. which is sufficiently high to sublimate said $^{99}MoO_3$ crystals and generate a gaseous mixture therefrom comprising vaporized $^{99m}TcO_3$ and vaporized $^{99m}TcO_2$, with said first temperature being sufficiently low to avoid melting said $^{99}MoO_3$ crystals and sufficiently low to likewise avoid forming vaporized $^{99}MoO_3$ during said heating of said $^{99}MoO_3$ crystals;

converting said vaporized $^{99m}TcO_3$ and said vaporized $^{99m}TcO_2$ in said gaseous mixture to a supply of vaporized $^{99m}Tc_2O_7$;

cooling said vaporized $^{99m}Tc_2O_7$ to a final temperature of about 20°–80° C. which is sufficient to condense said vaporized $^{99m}Tc_2O_7$ so that a condensed $^{99m}Tc$-containing reaction product is produced therefrom; and collecting said condensed $^{99m}Tc$-containing reaction product.

14. The method of claim 13 wherein said primary solvent is selected from the group consisting of $HNO_3$, $H_2O_2$ and $H_2SO_4$.

15. The method of claim 13 wherein said converting of said vaporized $^{99m}TcO_3$ and said vaporized $^{99m}TcO_2$ in said gaseous mixture to said vaporized $^{99m}Tc_2O_7$ comprises passing a supply of an oxidizing gas over said $^{99}MoO_3$ crystals during said heating thereof, said passing of said oxidizing gas over said $^{99}MoO_3$ crystals producing a gaseous stream comprising said oxidizing gas in combination with said gaseous mixture, said oxidizing gas oxidizing said vaporized $^{99m}TcO_3$ and said vaporized $^{99m}TcO_2$ in said gaseous mixture to form said vaporized $^{99m}Tc_2O_7$ therefrom.

16. The method of claim 13 wherein said providing of said initial supply of $^{99}Mo$ metal comprises:

providing an electron accelerator apparatus and a supply of $^{100}Mo$ metal;

activating said electron accelerator apparatus in order to generate high energy photons therein; and irradiating said $^{100}Mo$ metal with said high energy photons from said electron accelerator apparatus to produce said $^{99}Mo$ metal therefrom.

17. A method for isolating and producing a $^{99m}Tc$-containing reaction product from a $^{99}Mo$ compound comprising:

providing an initial supply of $^{99}Mo$ metal;

dissolving said $^{99}Mo$ metal in at least one oxygen-containing primary solvent to generate a solvated $^{99}Mo$ product;

drying said solvated $^{99}Mo$ product to produce a plurality of $^{99}MoO_3$ crystals;

providing a reaction chamber comprising a first end, a second end, a side wall, and a passageway through said reaction chamber from said first end to said second end, said reaction chamber further comprising a heating section beginning at said first end, heating means for applying heat to said heating section, and a reaction product collecting section at said second end of said reaction chamber;

heating said $^{99}MoO_3$ crystals within said heating section of said reaction chamber using said heating means to a first temperature, said first temperature being sufficiently high to sublimate said $^{99}MoO_3$ crystals and generate a gaseous mixture therefrom comprising vaporized $^{99m}TcO_3$ and vaporized $^{99m}TcO_2$, with said first temperature being sufficiently low to avoid melting said $^{99}MoO_3$ crystals and sufficiently low to likewise avoid forming vaporized $^{99}MoO_3$ during said heating of said $^{99}MoO_3$ crystals;

passing a supply of an oxidizing gas over said $^{99}MoO_3$ crystals during said heating thereof in said reaction chamber, said passing of said oxidizing gas over said $^{99}MoO_3$ crystals producing a gaseous stream comprising said oxidizing gas in combination with said gaseous mixture, said oxidizing gas oxidizing said vaporized $^{99m}TcO_3$ and said vaporized $^{99m}TcO_2$ in said gaseous mixture to form a supply of vaporized $^{99m}Tc_2O_7$ therefrom, said gaseous stream thereafter entering into said collecting section of said reaction chamber;

cooling said gaseous stream and said vaporized $^{99m}Tc_2O_7$ therein in said collecting section of said reaction chamber to a final temperature sufficient to condense and remove said vaporized $^{99m}Tc_2O_7$ from said gaseous stream so that a condensed $^{99m}$Tc-containing reaction product is produced within said collecting section from condensation of said vaporized $^{99m}Tc_2O_7$; and removing said condensed $^{99m}$Tc-containing reaction product from said collecting section of said reaction chamber.

18. The method of claim 17 wherein said first temperature is about 600°–775° C.

19. The method of claim 17 wherein said final temperature is about 20°–80° C.

20. The method of claim 17 wherein said providing of said initial supply of $^{99}$Mo metal comprises:

providing an electron accelerator apparatus and a supply of $^{100}$Mo metal;

activating said electron accelerator apparatus in order to generate high energy photons therein; and irradiating said $^{100}$Mo metal with said high energy photons from said electron accelerator apparatus to produce said $^{99}$Mo metal therefrom.

21. A method for isolating and producing a $^{99m}$Tc-containing reaction product from a $^{99}$Mo compound comprising:

providing an initial supply of $^{99}$Mo metal;

dissolving said $^{99}$Mo metal in at least one oxygen-containing primary solvent to generate a solvated $^{99}$Mo product;

drying said solvated $^{99}$Mo product to produce a plurality of $^{99}MoO_3$ crystals;

providing a reaction chamber comprising a first end, a second end, a side wall, and a passageway through said reaction chamber from said first end to said second end, said reaction chamber further comprising a heating section beginning at said first end, heating means for applying heat to said heating section, an intermediate section in fluid communication with said heating section, and a reaction product collecting section in fluid communication with said intermediate section, said collecting section being positioned at an angle of about 15°–165° relative to said intermediate section in order to minimize thermal energy transfer from said heating section and said intermediate section into said collecting section, said collecting section terminating at said second end of said reaction chamber with said intermediate section being positioned between said heating section and said collecting section;

heating said $^{99}MoO_3$ crystals within said heating section of said reaction chamber using said heating means to a first temperature, said first temperature being sufficiently high to sublimate said $^{99}MoO_3$ crystals and generate a gaseous mixture therefrom comprising vaporized $^{99m}TcO_3$ and vaporized $^{99m}TcO_2$, with said first temperature being sufficiently low to avoid melting said $^{99}MoO_3$ crystals and sufficiently low to likewise avoid forming vaporized $^{99}MoO_3$ during said heating of said $^{99}MoO_3$ crystals;

passing a supply of an oxidizing gas over said $^{99}MoO_3$ crystals during said heating thereof in said reaction chamber, said passing of said oxidizing gas over said $^{99}MoO_3$ crystals producing a gaseous stream comprising said oxidizing gas in combination with said gaseous mixture, said oxidizing gas oxidizing said vaporized $^{99m}TcO_3$ and said vaporized $^{99m}TcO_2$ in said gaseous mixture to form a supply of vaporized $^{99m}Tc_2O_7$ therefrom, said gaseous stream passing through said heating section and said intermediate section, said gaseous stream thereafter entering into said collecting section of said reaction chamber;

cooling said gaseous stream and said vaporized $^{99m}Tc_2O_7$ therein in said collecting section of said reaction chamber to a final temperature sufficient to condense and remove said vaporized $^{99m}Tc_2O_7$ from said gaseous stream so that a condensed $^{99m}$Tc-containing reaction product is produced within said collecting section from condensation of said vaporized $^{99m}Tc_2O_7$; and removing said condensed $^{99m}$Tc-containing reaction product from said collecting section of said reaction chamber.

22. The method of claim 21 wherein said first temperature is about 600°–775° C.

23. A method for isolating and producing a $^{99m}$Tc-containing reaction product from a $^{99}$Mo compound comprising:

providing an electron accelerator apparatus and a supply of $^{100}$Mo metal;

activating said electron accelerator apparatus in order to generate high energy photons therein;

irradiating said $^{100}$Mo metal with said high energy photons from said electron accelerator apparatus to produce $^{99}$Mo metal therefrom;

dissolving said $^{99}$Mo metal in at least one oxygen-containing primary solvent selected from the group consisting of $HNO_3$, $H_2O_2$, and $H_2SO_4$ to generate a solvated $^{99}$Mo product;

drying said solvated $^{99}$Mo product to produce a plurality of $^{99}MoO_3$ crystals;

providing a reaction chamber comprising a first end, a second end, a side wall, and a passageway through said reaction chamber from said first end to said second end, said reaction chamber further comprising a heating section beginning at said first end, heating means for applying heat to said heating section, an intermediate section in fluid communication with said heating section, and a reaction product collecting section in fluid communication with said intermediate section, said collecting section being positioned at an angle of about 15°–165° relative to said intermediate section in order to minimize thermal energy transfer from said heating section and said intermediate section into said collecting section, said collecting section terminating at said second end of said reaction chamber with said intermediate section being positioned between said heating section and said collecting section;

heating said $^{99}MoO_3$ crystals within said heating section of said reaction chamber using said heating means to a first temperature of about 600°–775° C. which is sufficiently high to sublimate said $^{99}MoO_3$ crystals and generate a gaseous mixture therefrom comprising vaporized $^{99m}TcO_3$ and vaporized $^{99m}TcO_2$, with said first temperature being sufficiently low to avoid melting said $^{99}MoO_3$ crystals and sufficiently low to likewise avoid forming vaporized$^{99}MoO_3$ during said heating of said $^{99}MoO_3$ crystals;

passing a supply of an oxidizing gas over said $^{99}MoO_3$ crystals during said heating thereof in said reaction chamber, said oxidizing gas being selected from the group consisting of $O_{2(g)}$, air, $O_{3(g)}$, $H_2O_{2(g)}$, and $NO_{2(g)}$, said passing of said oxidizing gas over said $^{99}MoO_3$ crystals producing a gaseous stream comprising said oxidizing gas in combination with said gaseous mixture, said oxidizing gas oxidizing said vaporized $^{99m}TcO_3$ and said vaporized $^{99m}TcO_2$ in said gaseous mixture to form a supply of vaporized $^{99m}Tc_2O_7$ therefrom, said gaseous stream passing through said heating section and said intermediate section, said gaseous stream thereafter entering into said collecting section of said reaction chamber;

cooling said gaseous stream and said vaporized $^{99m}Tc_2O_7$ therein in said collecting section of said reaction chamber to a final temperature of about 20°–80° C. which is sufficient to condense and remove said vaporized $^{99m}Tc_2O_7$ from said gaseous stream so that a condensed $^{99m}Tc$-containing reaction product is produced within said collecting section from condensation of said vaporized $^{99m}Tc_2O_7$; and removing said condensed $^{99m}Tc$-containing reaction product from said collecting section of said reaction chamber.

24. A method for isolating and producing a $^{99m}Tc$-containing reaction product from a $^{99}Mo$ compound comprising:

providing an initial supply of $^{99}Mo$ metal;

dissolving said $^{99}Mo$ metal in at least one oxygen-containing primary solvent to generate a solvated $^{99}Mo$ product;

drying said solvated $^{99}Mo$ product to produce a plurality of $^{99}MoO_3$ crystals;

heating said $^{99}MoO_3$ crystals to a first temperature, said first temperature being sufficiently high to sublimate said $^{99}MoO_3$ crystals and generate a gaseous mixture therefrom comprising vaporized $^{99m}TcO_3$ and vaporized $^{99m}TcO_2$, with said first temperature being sufficiently low to avoid melting said $^{99}MoO_3$ crystals and sufficiently low to likewise avoid forming vaporized $^{99}MoO_3$ during said heating of said $^{99}MoO_3$ crystals, said heating of said $^{99}MoO_3$ crystals leaving a residual $^{99}MoO_3$-containing reaction product after said heating of said $^{99}MoO_3$ crystals is terminated;

converting said vaporized $^{99m}TcO_3$ and said vaporized $^{99m}TcO_2$ in said gaseous mixture to a supply of vaporized $^{99m}Tc_2O_7$;

cooling said vaporized $^{99m}Tc_2O_7$ to a final temperature sufficient to condense said vaporized $^{99m}Tc_2O_7$ so that a condensed $^{99m}Tc$-containing reaction product is produced therefrom;

collecting said condensed $^{99m}Tc$-containing reaction product;

collecting said residual $^{99}MoO_3$-containing reaction product;

dissolving said residual $^{99}MoO_3$-containing reaction product in at least one secondary solvent in order to produce a dissolved $^{99}MoO_3$ product; and drying said dissolved $^{99}MoO_3$ product in order to produce a supply of regenerated $^{99}MoO_3$ crystals which can reprocessed to obtain additional quantities of said $^{99m}Tc$-containing reaction product therefrom.

25. The method of claim 24 wherein said secondary solvent is selected from the group consisting of $NH_4OH$ and $H_2SO_4$.

26. The method of claim 24 wherein said drying of said dissolved $^{99}MoO_3$ product comprises heating said dissolved $^{99}MoO_3$ product at a temperature of about 250°–500° C for about 5–60 minutes.

* * * * *